(12) United States Patent
Kabelac

(10) Patent No.: US 7,898,763 B2
(45) Date of Patent: Mar. 1, 2011

(54) SERVO PATTERN ARCHITECTURE TO UNCOUPLE POSITION ERROR DETERMINATION FROM LINEAR POSITION INFORMATION

(75) Inventor: William John Kabelac, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 12/353,095

(22) Filed: Jan. 13, 2009

(65) Prior Publication Data

US 2010/0177435 A1    Jul. 15, 2010

(51) Int. Cl.
G11B 5/584    (2006.01)
(52) U.S. Cl. .................................................. 360/77.12
(58) Field of Classification Search .............. 360/77.12, 360/48, 49, 75, 134; 704/219, 220, 221, 704/223
See application file for complete search history.

(56) References Cited

U.S. PATENT DOCUMENTS

| 4,337,398 | A | * | 6/1982 | Ohnishi et al. .............. 250/548 |
| 5,432,652 | A | | 7/1995 | Comeaux et al. |
| 6,141,638 | A | * | 10/2000 | Peng et al. .................. 704/211 |
| 6,169,640 | B1 | * | 1/2001 | Fasen .......................... 360/48 |
| 6,320,719 | B1 | | 11/2001 | Albrecht et al. |
| 6,470,313 | B1 | * | 10/2002 | Ojala .......................... 704/223 |
| 6,493,959 | B2 | * | 12/2002 | deLassus ..................... 33/549 |
| 6,522,490 | B1 | | 2/2003 | Cates et al. |
| 6,556,966 | B1 | * | 4/2003 | Gao ............................. 704/220 |
| 6,739,067 | B2 | * | 5/2004 | Muller ........................ 33/703 |
| 6,937,413 | B2 | | 8/2005 | Bui et al. |
| 6,989,950 | B2 | * | 1/2006 | Ohtsu .......................... 360/48 |
| 7,095,583 | B2 | | 8/2006 | Johnson et al. |
| 7,126,109 | B2 | * | 10/2006 | Goldman et al. ....... 250/231.14 |
| 7,170,702 | B2 | * | 1/2007 | Ohtsu .......................... 360/48 |
| 7,355,805 | B2 | * | 4/2008 | Nakao et al. .................. 360/48 |
| 7,363,218 | B2 | * | 4/2008 | Jabri et al. .................. 704/221 |
| 7,363,219 | B2 | * | 4/2008 | Stachurski ................... 704/223 |
| 7,477,474 | B2 | * | 1/2009 | Goker et al. ............. 360/77.12 |
| 7,605,995 | B2 | * | 10/2009 | Ohtsu .......................... 360/75 |
| 7,684,143 | B2 | * | 3/2010 | Jaquette ................... 360/77.12 |
| 2004/0093368 | A1 | * | 5/2004 | Lee et al. ..................... 708/520 |
| 2005/0219734 | A1 | | 10/2005 | Rothermel et al. |
| 2005/0231845 | A1 | * | 10/2005 | Shirouzu ..................... 360/48 |
| 2005/0286159 | A1 | | 12/2005 | Bui et al. |
| 2005/0286160 | A1 | | 12/2005 | Bui et al. |
| 2006/0291090 | A1 | | 12/2006 | Dugas et al. |
| 2009/0161249 | A1 | * | 6/2009 | Takayama et al. ......... 360/77.12 |
| 2009/0303635 | A1 | * | 12/2009 | Kabelac ..................... 360/134 |
| 2010/0153100 | A1 | * | 6/2010 | Kyung Jin et al. .......... 704/219 |

OTHER PUBLICATIONS

IBM TDB, "Skewed Servo Write Head," IP.com, Inc., 1976, IP.com No. IPCOM00086191D.

* cited by examiner

Primary Examiner—Fred Tzeng
(74) Attorney, Agent, or Firm—Dale F. Regelman; Quarles & Brady LLP

(57) ABSTRACT

A sequential data storage medium, such as for example and without limitation a magnetic tape, comprising a plurality of servo patterns encoded in a non-data region, wherein each of said servo patterns comprises a first subframe comprising 10 pulses, a second subframe comprising 8 pulses, and a third subframe comprising (N) pulses, wherein (N) is greater than or equal to 0. The first subframe and the second subframe do not encode any linear position ("LPOS") data. The third subframe encodes up to (N) LPOS bits.

20 Claims, 21 Drawing Sheets

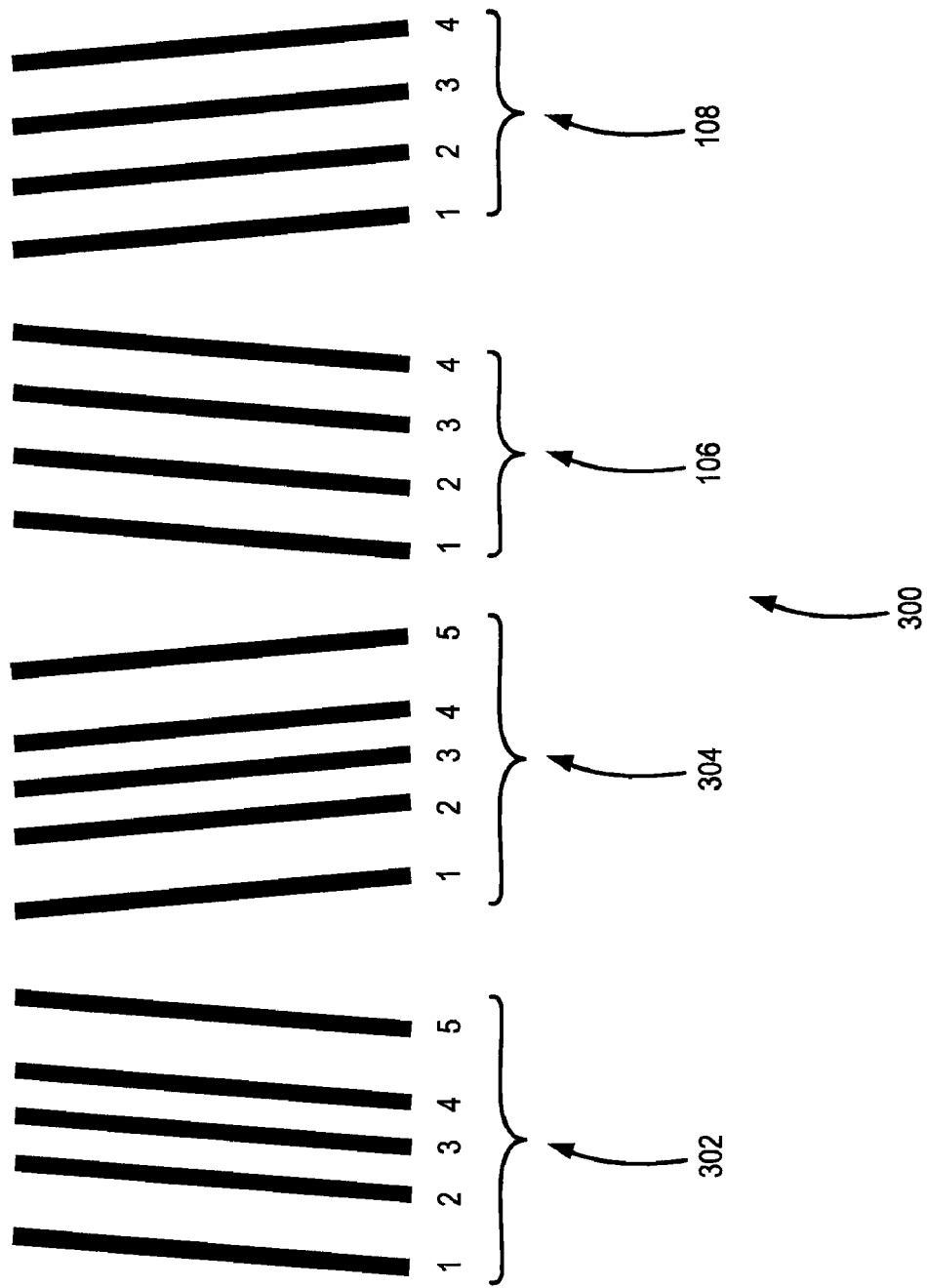

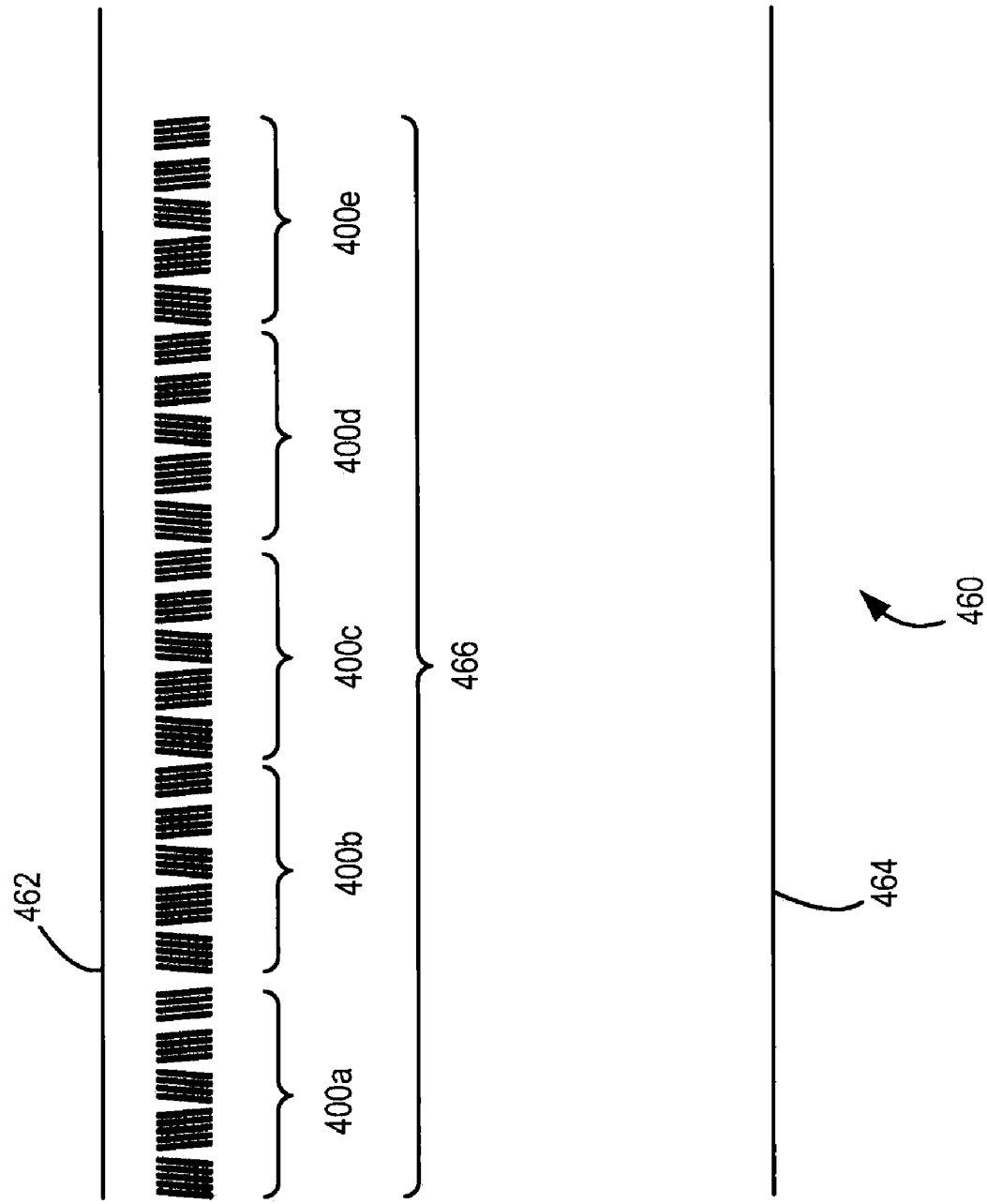

FIG. 5A - ENCODES 1111
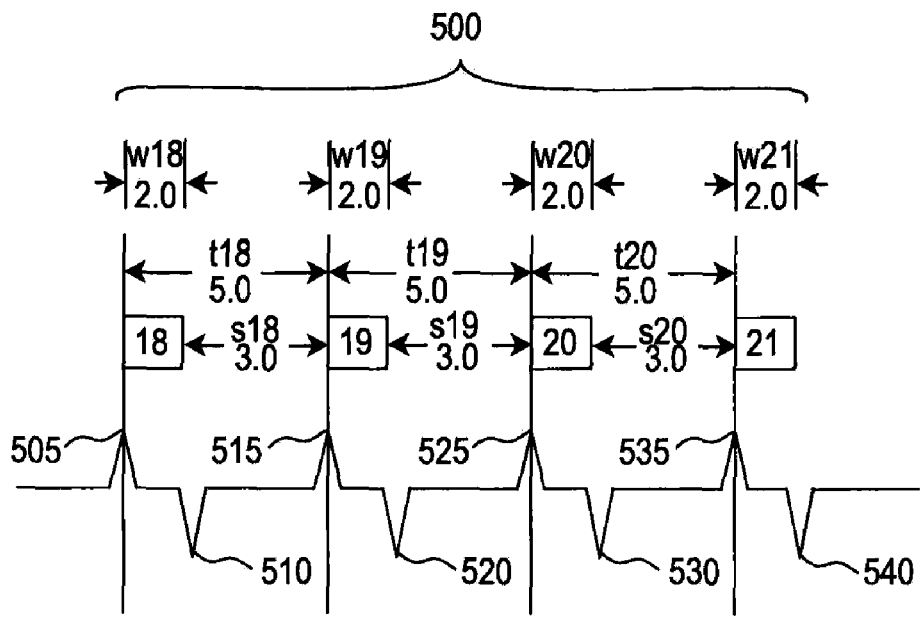
FIG. 5B - ENCODES 1111
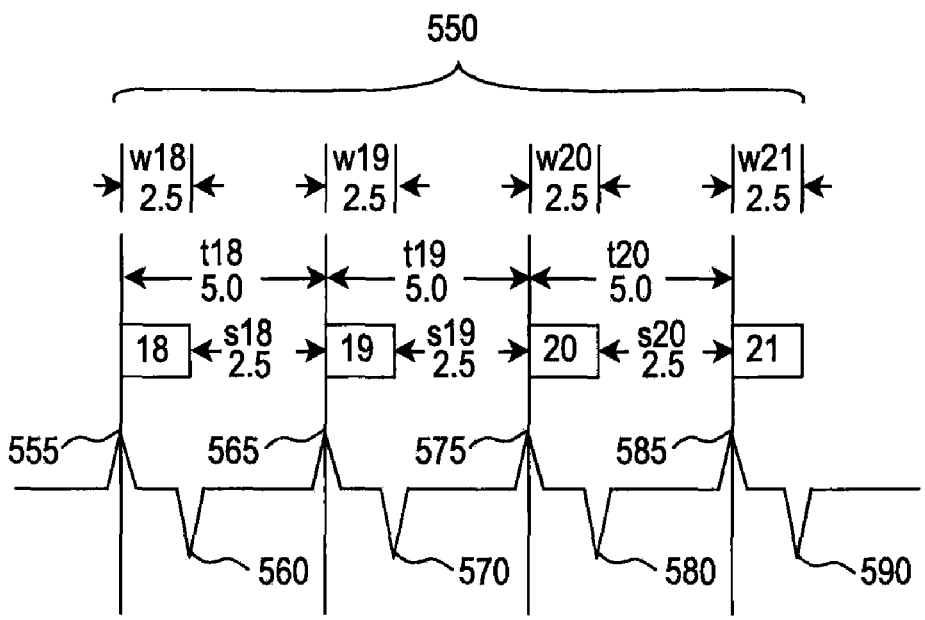

FIG. 6A - ENCODES 1110
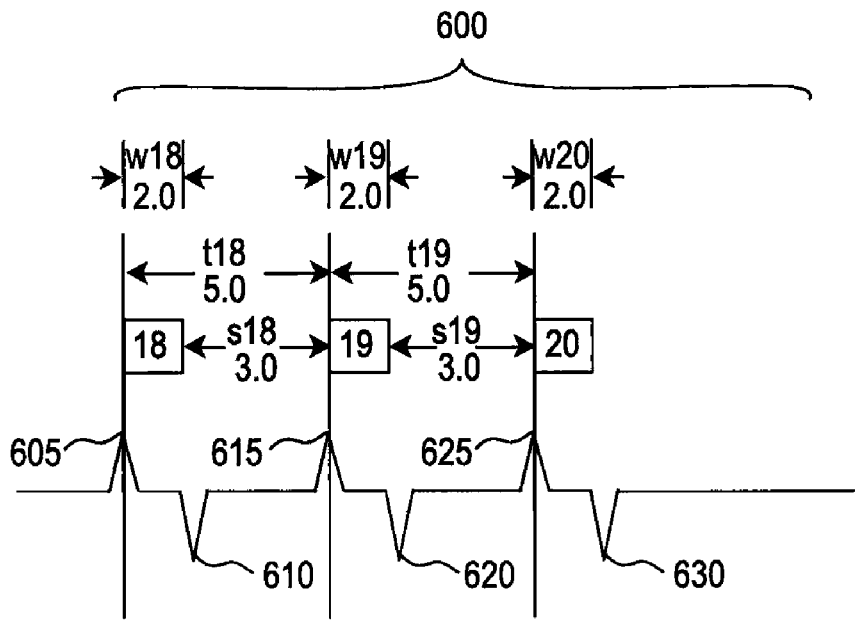
FIG. 6B - ENCODES 1110
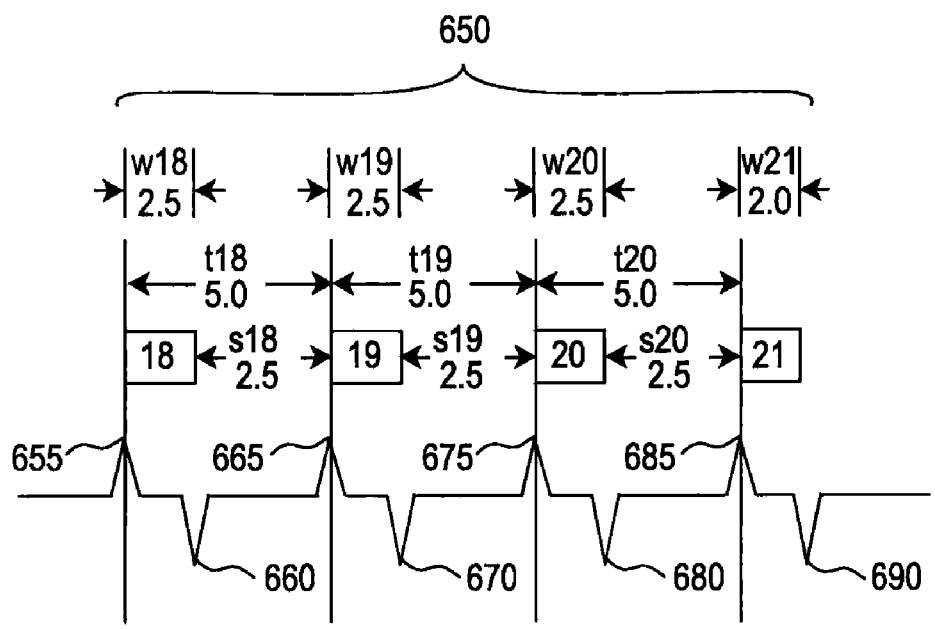

FIG. 7A - ENCODES 1100
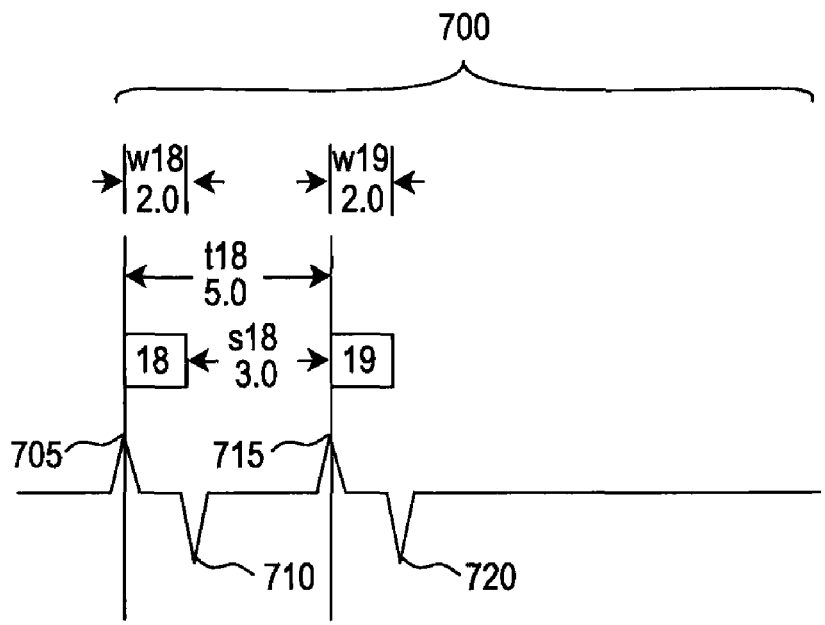
FIG. 7B - ENCODES 1100
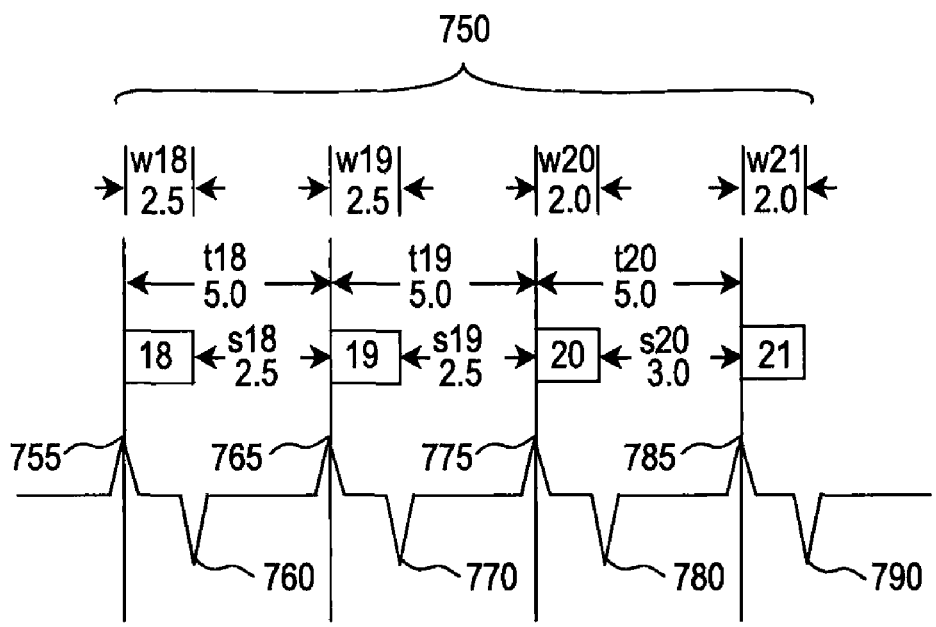

FIG. 8A - ENCODES 1000
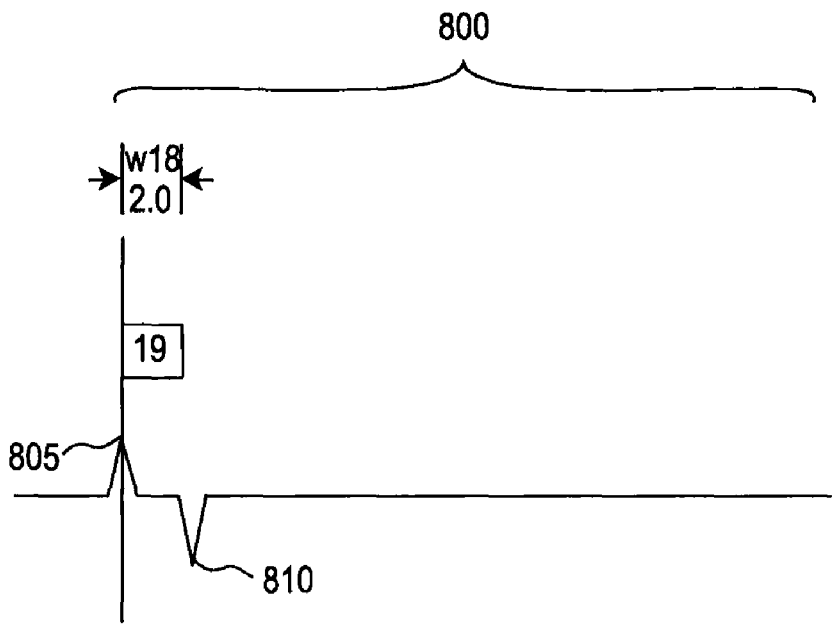
FIG. 8B - ENCODES 1000
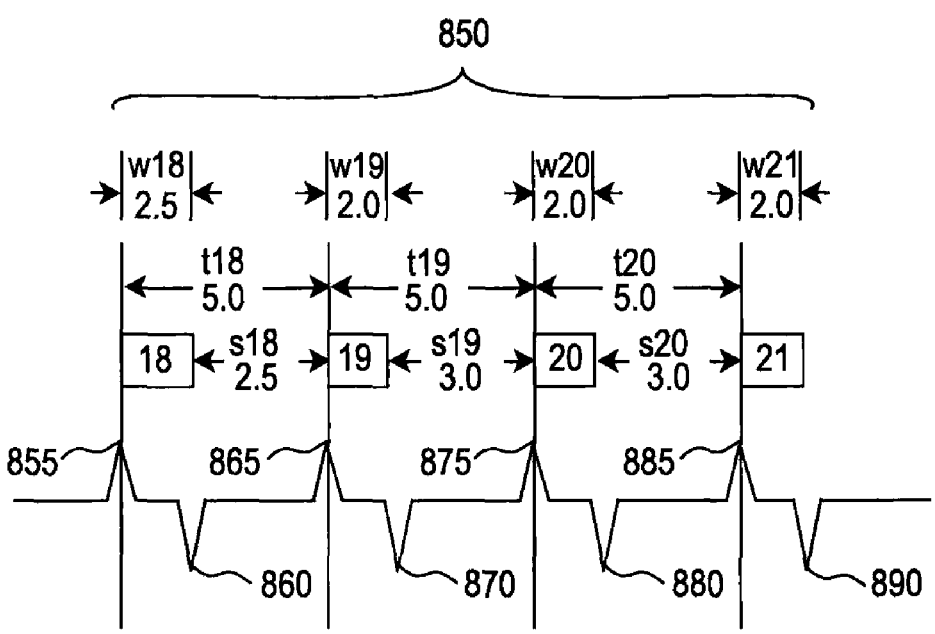

FIG. 9A - ENCODES 1101
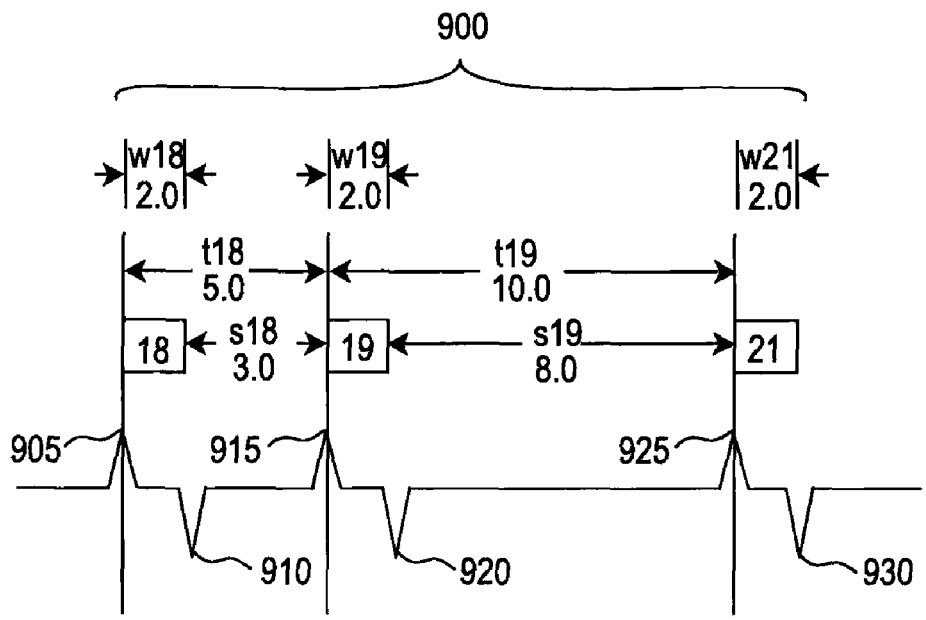
FIG. 9B - ENCODES 1101
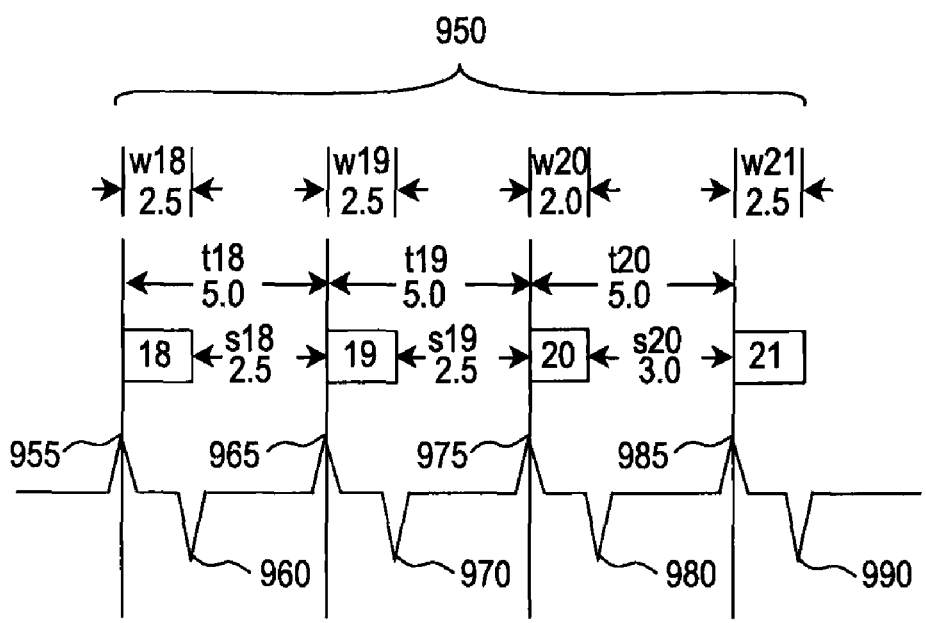

FIG. 10A - ENCODES 1001
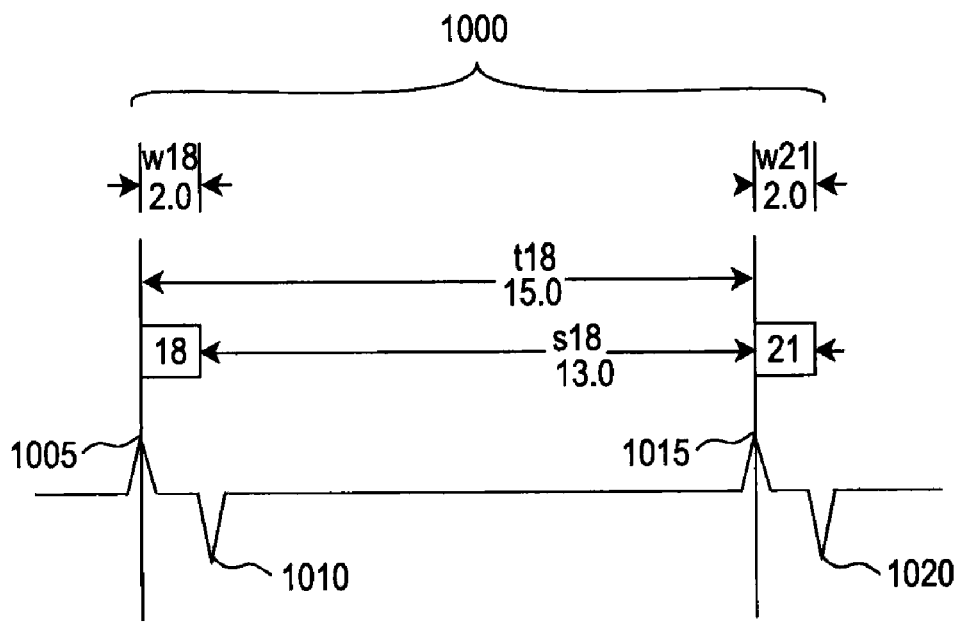
FIG. 10B - ENCODES 1001
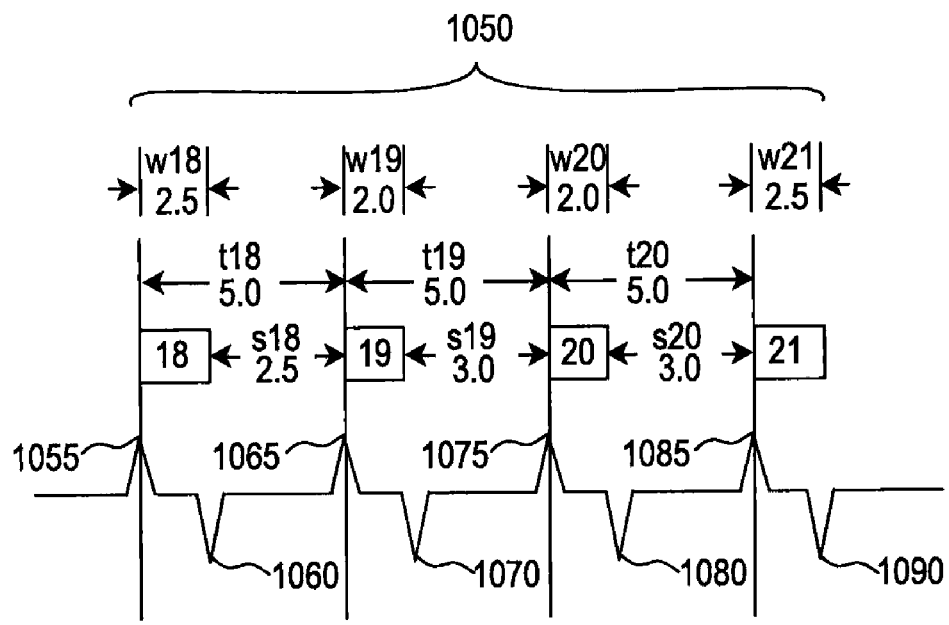

FIG. 11A - ENCODES 1011
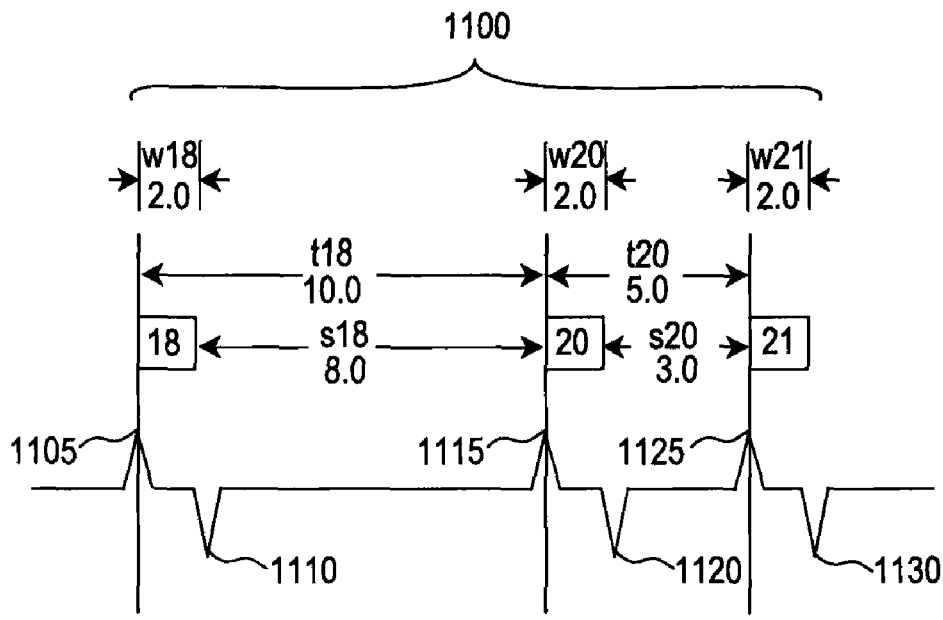
FIG. 11B - ENCODES 1011
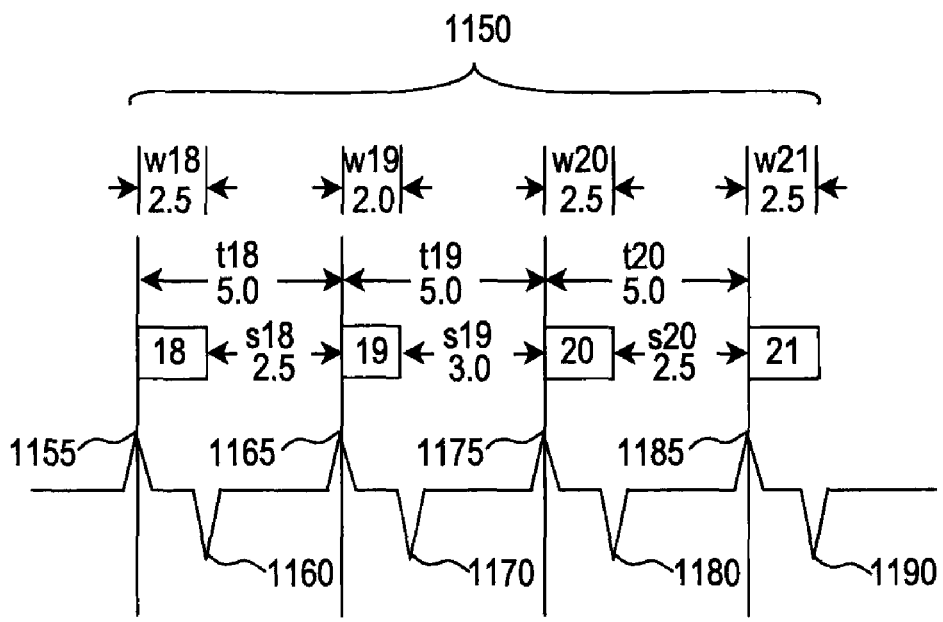

FIG. 12A - ENCODES 0011
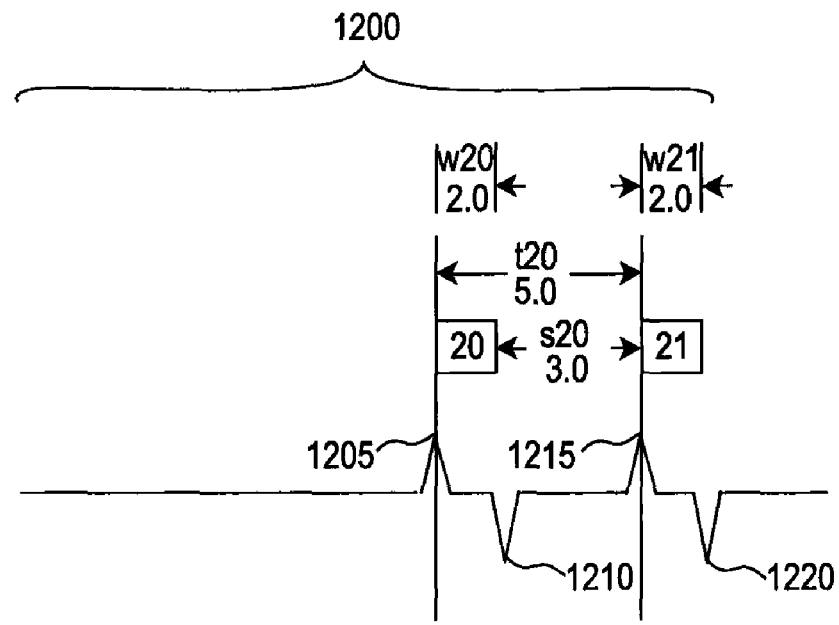
FIG. 12B - ENCODES 0011
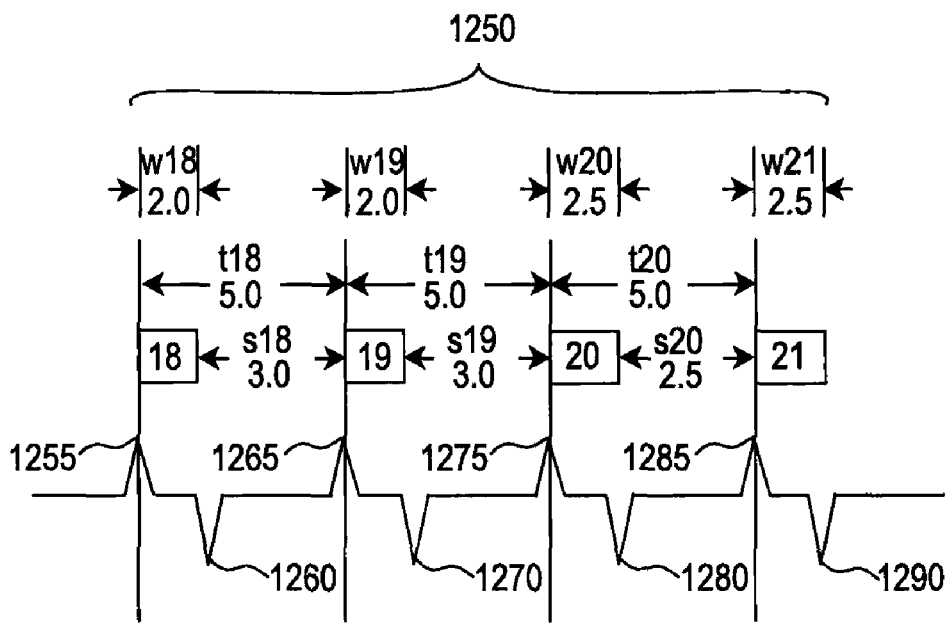

FIG. 13A - ENCODES 0111
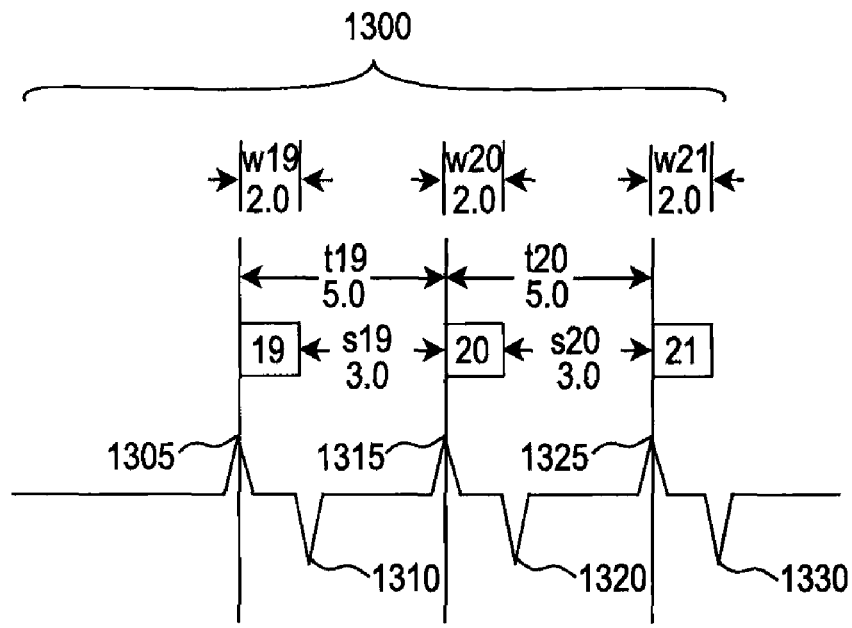
FIG. 13B - ENCODES 0111
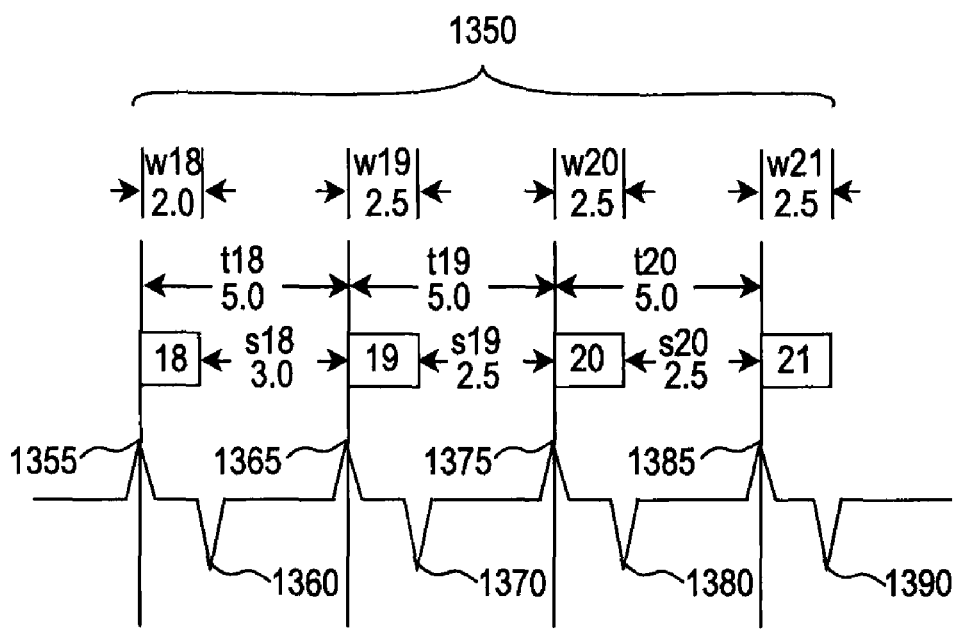

FIG. 14A - ENCODES 0101
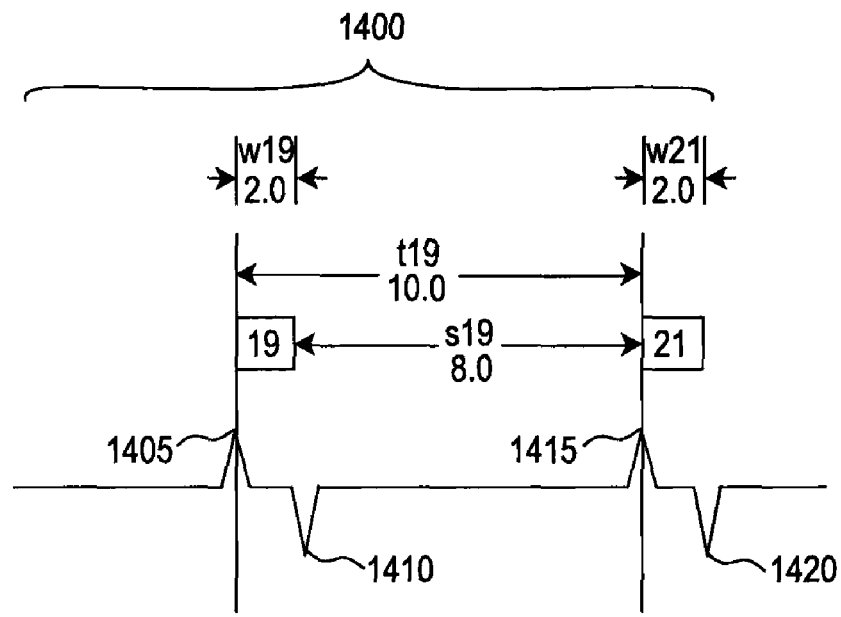
FIG. 14B - ENCODES 0101
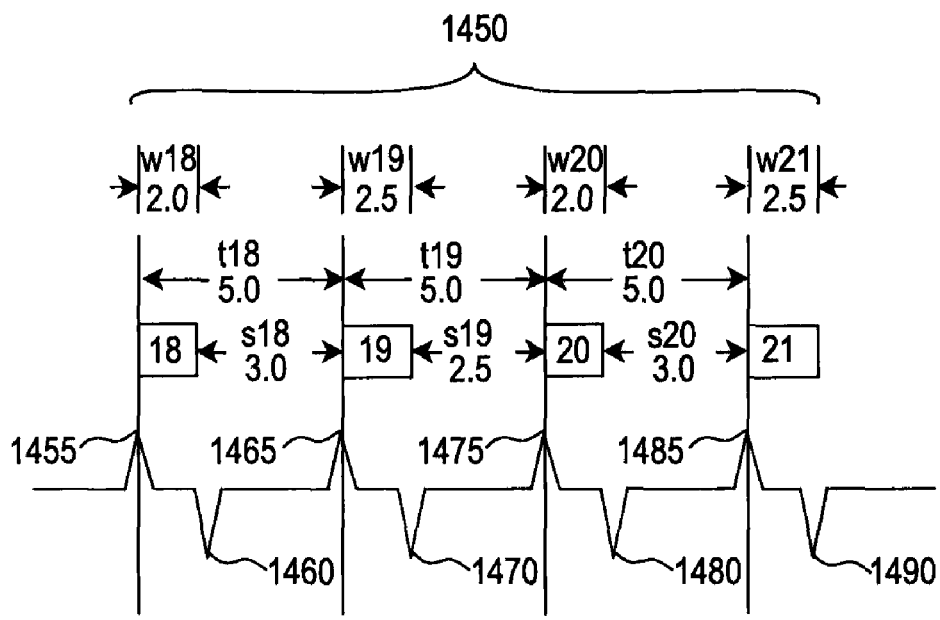

FIG. 15A - ENCODES 0100
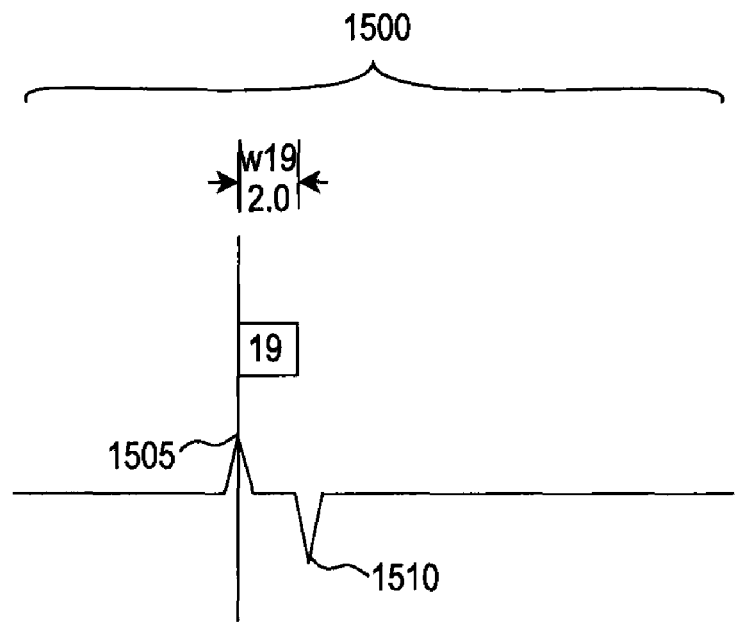
FIG. 15B - ENCODES 0100
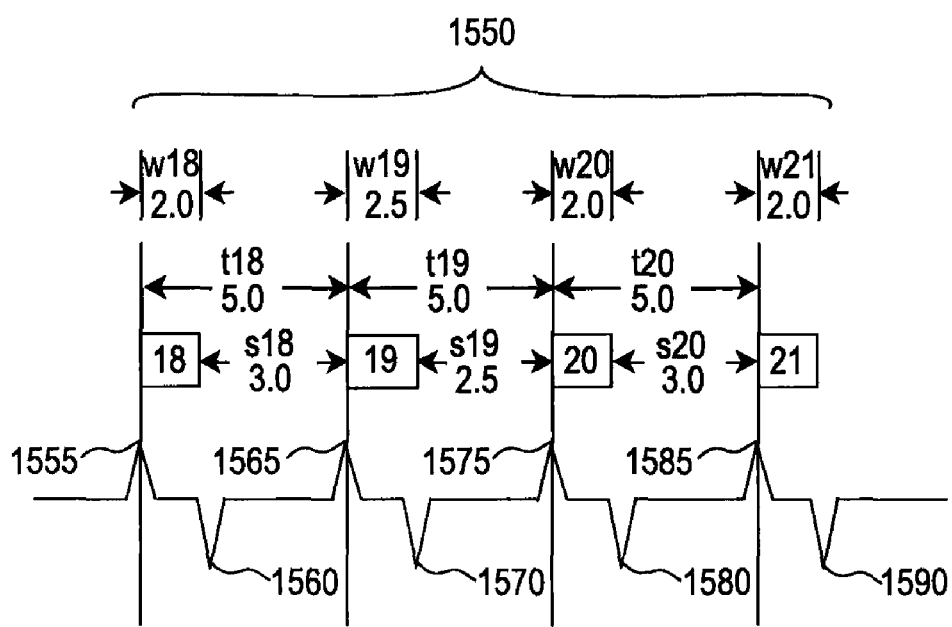

FIG. 16A - ENCODES 0010
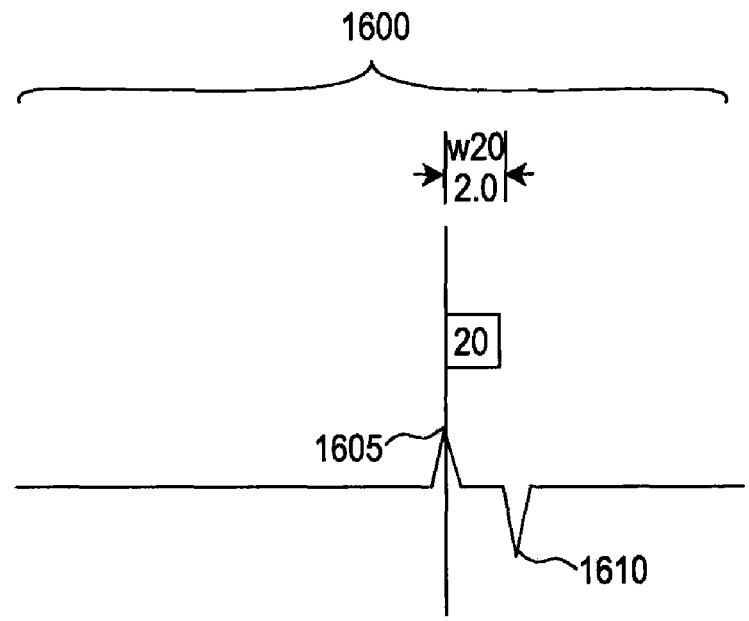
FIG. 16B - ENCODES 0010
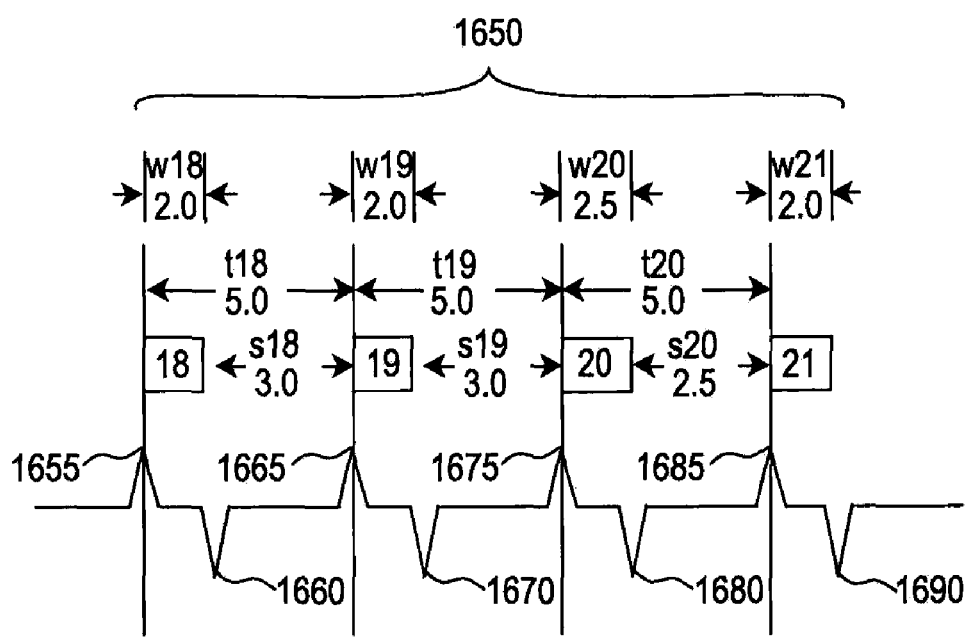

FIG. 17A - ENCODES 0001
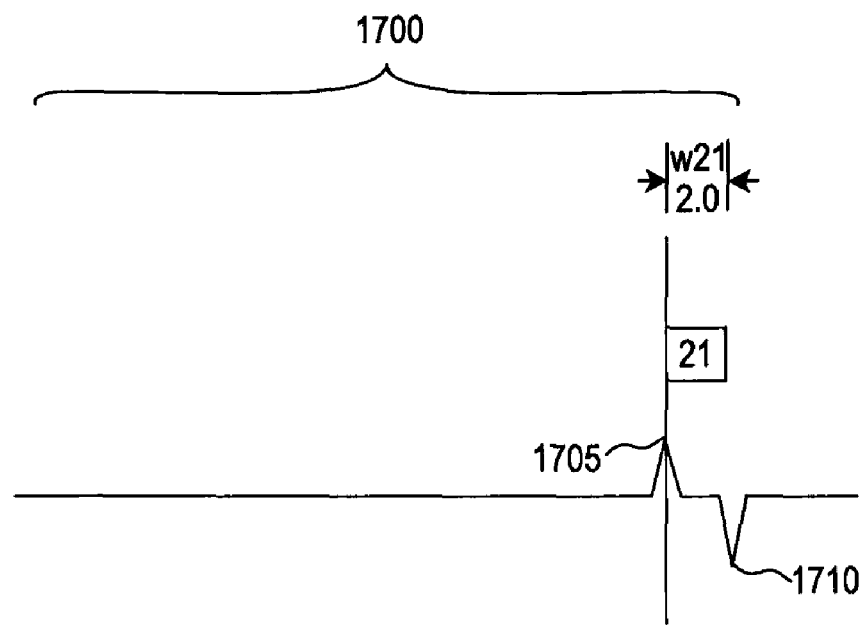
FIG. 17B - ENCODES 0001
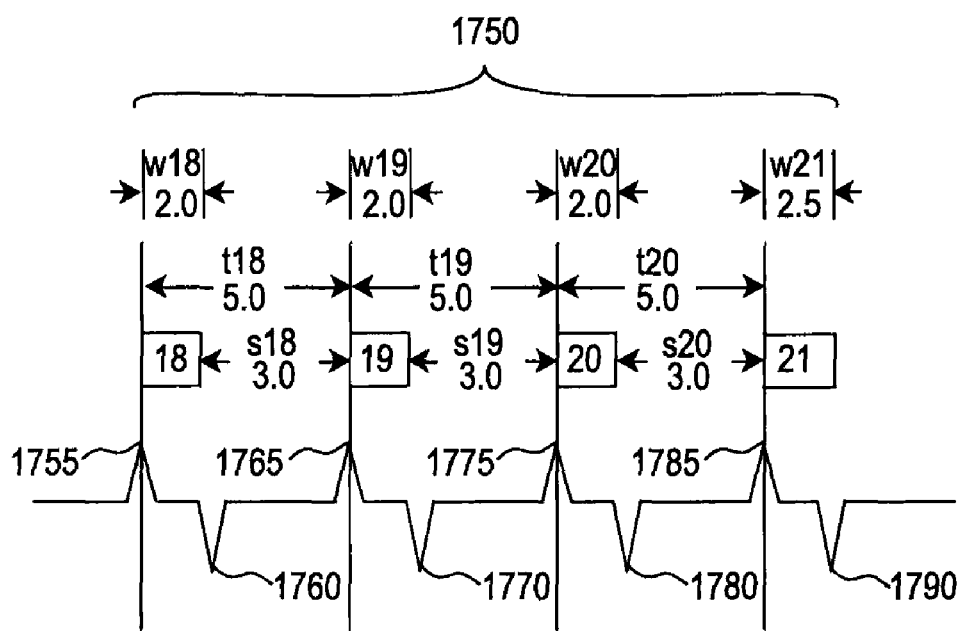

FIG. 18A - ENCODES 0000
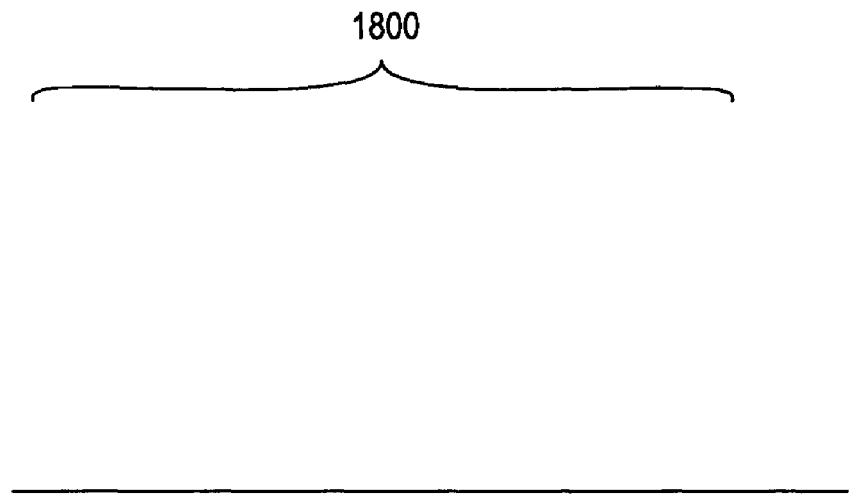
FIG. 18B - ENCODES 0000
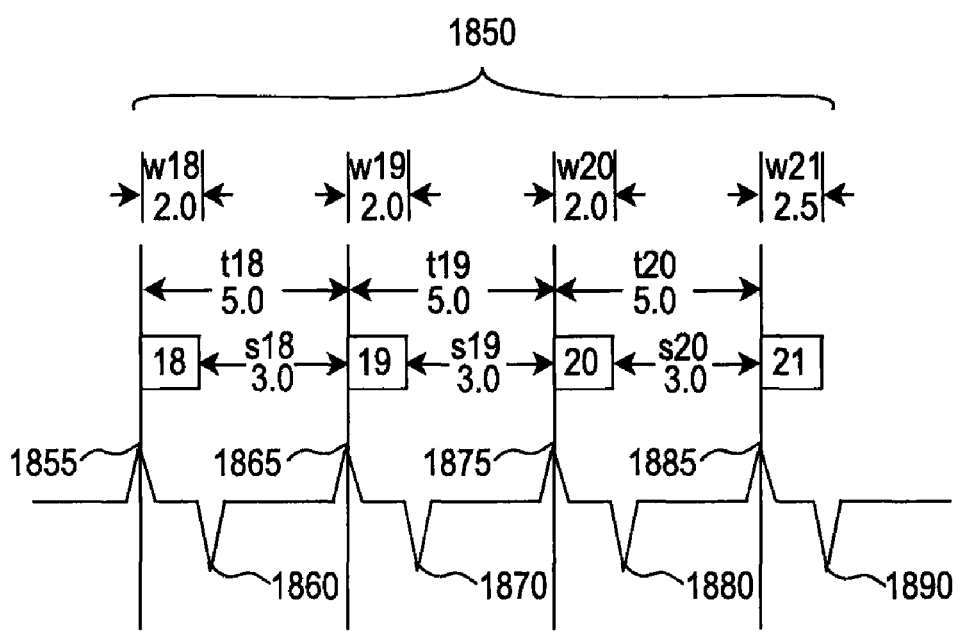

FIG. 19A - ENCODES 1010
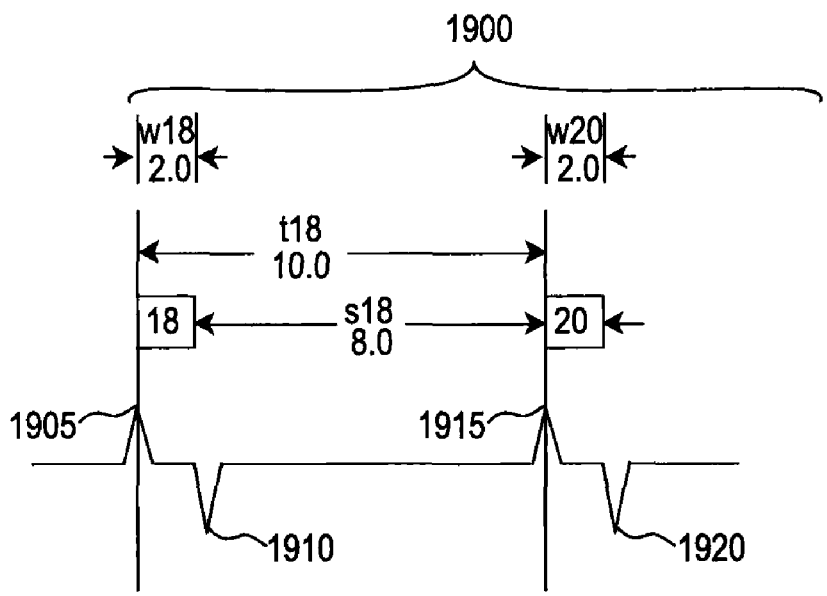
FIG. 19B - ENCODES 1010
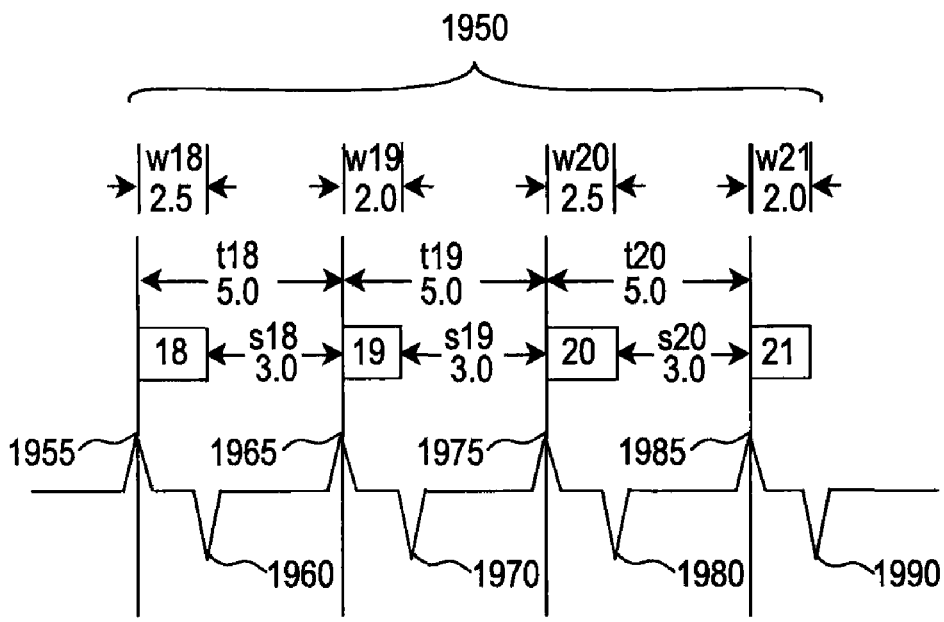

FIG. 20A - ENCODES 0110
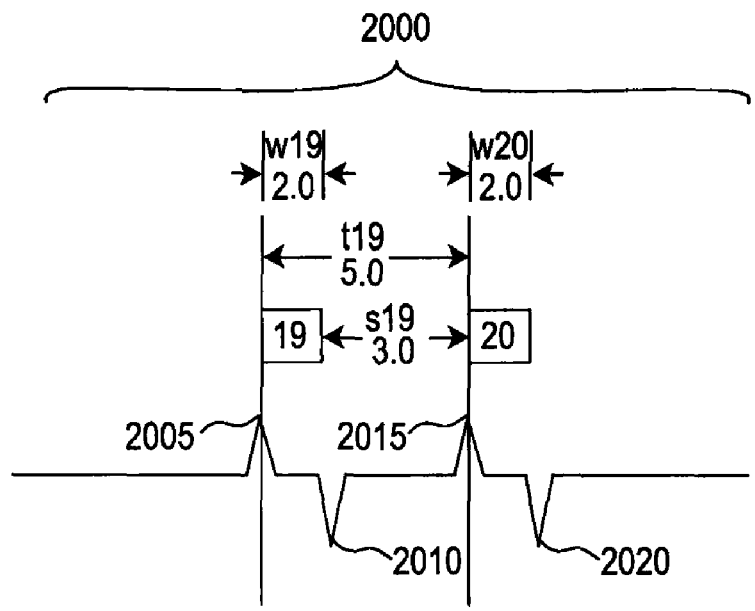
FIG. 20B - ENCODES 0110
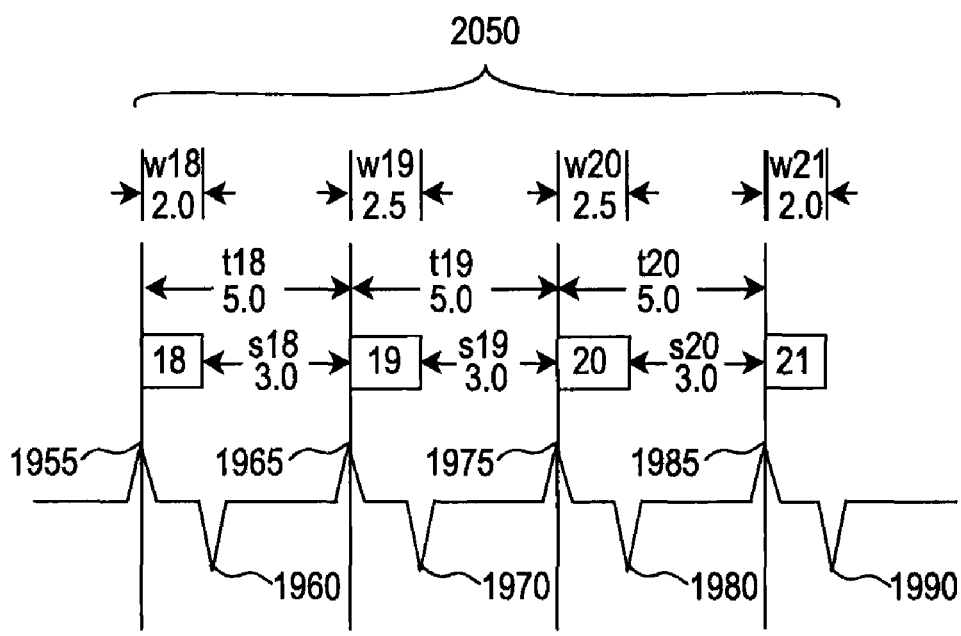

SERVO PATTERN ARCHITECTURE TO UNCOUPLE POSITION ERROR DETERMINATION FROM LINEAR POSITION INFORMATION

FIELD OF THE INVENTION

Applicant's invention relates to servo pattern architecture, and a method using that servo pattern architecture, to uncouple position error determination from linear position information in a sequential storage medium, such as for example a magnetic tape.

BACKGROUND OF THE INVENTION

Timing-based servo (TBS) is a technology developed for linear tape drives. In TBS systems, recorded servo patterns consist of transitions with two different azimuthal slopes. Head position is derived from the relative timing of pulses, or dibits, generated by a narrow head reading the relatively wide servo patterns. TBS patterns also allow the encoding of additional longitudinal position ("LPOS") information without affecting the generation of the transversal position error signal ("PES"). This is obtained by shifting transitions from their nominal pattern position using pulse-position modulation (PPM).

A specification for the servo format in current midrange tape drives is provided by the linear tape-open (LTO) format. The complete format for LTO drives of generation 1 (LTO-1) was standardized by the European Computer Manufacturers Association (ECMA) in 2001 as ECMA-319.

Traditionally, the detection of LPOS information bits is based on the observation of the shifts of the arrival times of the dibit peaks within the servo bursts at the servo reader output. It is known in the art to encode by pulse position modulation an LPOS word comprising 36 bits of information in a non-data region of a sequential data storage medium, such as a magnetic tape. Each encoded LPOS word in the standard ECMA-319 on data interchange on 12.7 mm 384-track magnetic tape cartridges relates to a specific absolute longitudinal address, and appears every 7.2 mm down the tape. Using prior art methods, an LPOS word comprises 36 individual servo patterns, i.e. frames, wherein each frame encodes one bit of information. The LPOS values of two consecutive LPOS words differ by one. Therefore, a tape drive can position a data/servo head assembly at a specified LPOS address thereby achieving a longitudinal resolution of about 7.2 mm.

SUMMARY OF THE INVENTION

Applicant's invention comprises a sequential data storage medium, comprising a sequence of a plurality of servo patterns encoded in a non-data region, wherein each of said servo patterns comprises a first subframe comprising 10 pulses, a second subframe comprising 8 pulses, and a third subframe comprising (N) pulses, wherein (N) is greater than or equal to 0. The first subframe and the second subframe do not encode any linear position ("LPOS") data. The third subframe encodes up to (N) LPOS bits. Applicant's servo pattern architecture uncouples PES signal generation and LPOS signal generation by replacing LPOS bit phase encoding with transition encoding. LPOS bits no longer reside in either Subframe 1 or Subframe 2. Rather, LPOS bits are transition encoded in new Subframe 3.

Applicant's invention further comprises a method to encode information in a non-data region of Applicant's sequential data storage medium using Applicant's servo pattern architecture. In certain embodiments, Applicant's method provides higher reliability of detection of information and lower decoding latency as compared to prior art approaches.

BRIEF DESCRIPTION OF THE DRAWINGS

The invention will be better understood from a reading of the following detailed description taken in conjunction with the drawings in which like reference designators are used to designate like elements, and in which:

FIG. 3 illustrates a second prior art servo pattern used to encode a single bit of information;

FIG. 4B illustrates a sequential storage medium comprising a servo band encoded herein, wherein the servo band comprises a plurality of the servo pattern of FIG. 4A;

FIG. 5A illustrates a first embodiment of Applicant's Subframe 3 architecture used to encode a value "1111";

FIG. 5B illustrates a second embodiment of Applicant's Subframe 3 architecture used to encode a value "1111";

FIG. 6A illustrates a first embodiment of Applicant's Subframe 3 architecture used to encode a value "1110";

FIG. 6B illustrates a second embodiment of Applicant's Subframe 3 architecture used to encode a value "1110";

FIG. 7A illustrates a first embodiment of Applicant's Subframe 3 architecture used to encode a value "1100";

FIG. 7B illustrates a second embodiment of Applicant's Subframe 3 architecture used to encode a value "1100";

FIG. 8A illustrates a first embodiment of Applicant's Subframe 3 architecture used to encode a value "1000";

FIG. 8B illustrates a second embodiment of Applicant's Subframe 3 architecture used to encode a value "1000";

FIG. 9A illustrates a first embodiment of Applicant's Subframe 3 architecture used to encode a value "1101";

FIG. 9B illustrates a second embodiment of Applicant's Subframe 3 architecture used to encode a value "1101";

FIG. 10A illustrates a first embodiment of Applicant's Subframe 3 architecture used to encode a value "1001";

FIG. 10B illustrates a second embodiment of Applicant's Subframe 3 architecture used to encode a value "1001";

FIG. 11A illustrates a first embodiment of Applicant's Subframe 3 architecture used to encode a value "1011";

FIG. 11B illustrates a second embodiment of Applicant's Subframe 3 architecture used to encode a value "1011";

FIG. 12A illustrates a first embodiment of Applicant's Subframe 3 architecture used to encode a value "0011";

FIG. 12B illustrates a second embodiment of Applicant's Subframe 3 architecture used to encode a value "0011";

FIG. 13A illustrates a first embodiment of Applicant's Subframe 3 architecture used to encode a value "0111";

FIG. 13B illustrates a second embodiment of Applicant's Subframe 3 architecture used to encode a value "0111";

FIG. 14A illustrates a first embodiment of Applicant's Subframe 3 architecture used to encode a value "0101";

FIG. 14B illustrates a second embodiment of Applicant's Subframe 3 architecture used to encode a value "0101";

FIG. 15A illustrates a first embodiment of Applicant's Subframe 3 architecture used to encode a value "0100";

FIG. 15B illustrates a second embodiment of Applicant's Subframe 3 architecture used to encode a value "0100";

FIG. 16A illustrates a first embodiment of Applicant's Subframe 3 architecture used to encode a value "0010";

FIG. 16B illustrates a second embodiment of Applicant's Subframe 3 architecture used to encode a value "0010";

FIG. 17A illustrates a first embodiment of Applicant's Subframe 3 architecture used to encode a value "0001";

FIG. 17B illustrates a second embodiment of Applicant's Subframe 3 architecture used to encode a value "0001";

FIG. 18A illustrates a first embodiment of Applicant's Subframe 3 architecture used to encode a value "0000";

FIG. 18B illustrates a second embodiment of Applicant's Subframe 3 architecture used to encode a value "0000";

FIG. 19A illustrates a first embodiment of Applicant's Subframe 3 architecture used to encode a value "1010";

FIG. 19B illustrates a second embodiment of Applicant's Subframe 3 architecture used to encode a value "1010";

FIG. 20A illustrates a first embodiment of Applicant's Subframe 3 architecture used to encode a value "0110";

FIG. 20B illustrates a second embodiment of Applicant's Subframe 3 architecture used to encode a value "0110."

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In sequential data storage media, such as for example magnetic tape storage media, servo patterns are encoded in non-data portions of the medium. Those servo patterns are used to position a read/write head with respect to a plurality of data tracks, to provide sync data, to provide manufacturer data, and to determine linear position ("LPOS") along the length of the medium.

Figure 1:
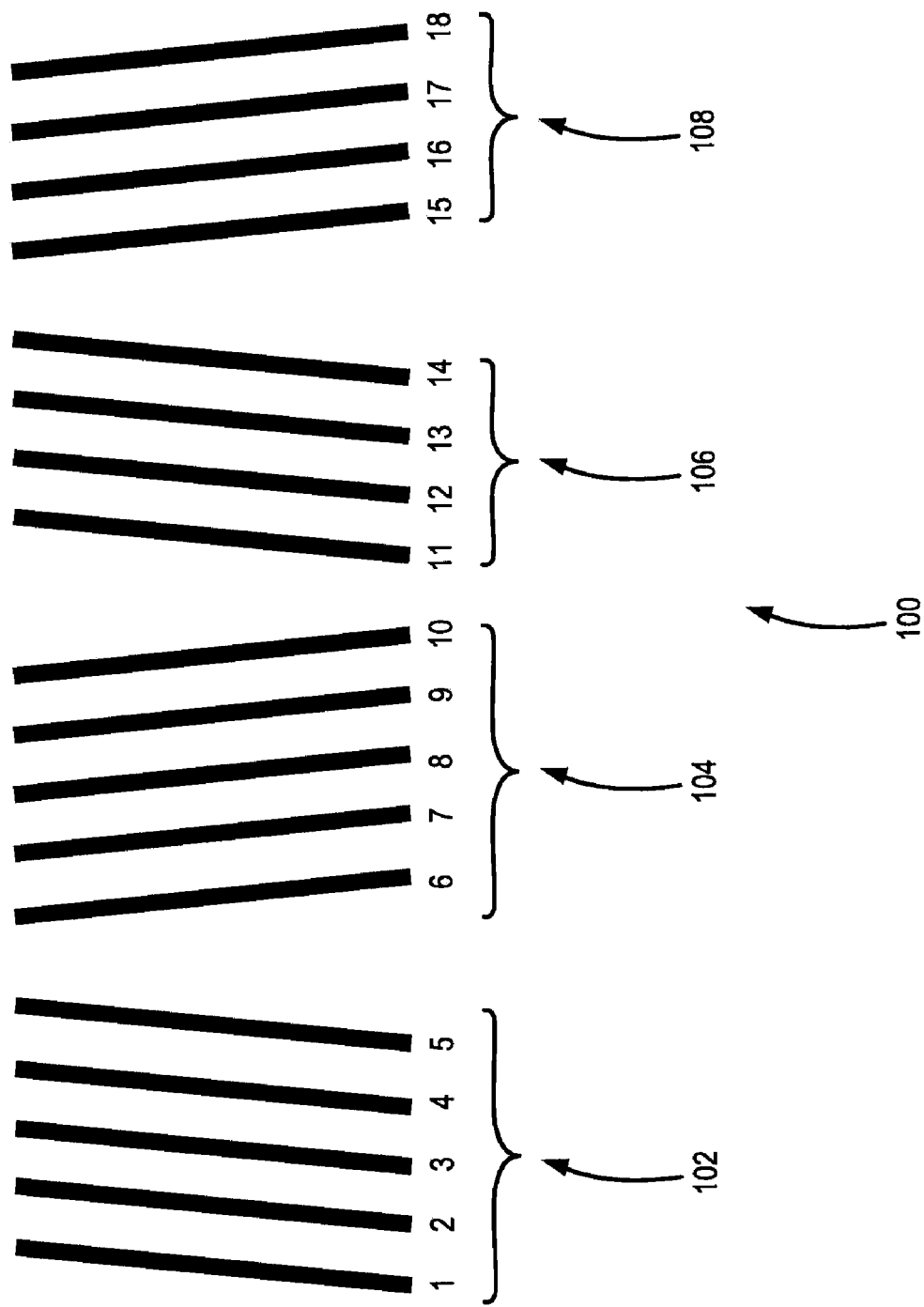
FIG. 1 illustrates a servo pattern comprising four bursts, wherein each of those four bursts comprises a plurality of pulses.

Referring to FIG. 1, servo pattern 100 consists of transitions with two different azimuthal slopes. Read/write head position is derived from the relative timing of pulses generated by a narrow head reading the pattern. Servo pattern 100 comprises Subframe 1 which comprises burst pattern 102 in combination with burst pattern 104, and Subframe 2 which comprises burst pattern 106 in combination with burst pattern 108.

Figure 2:
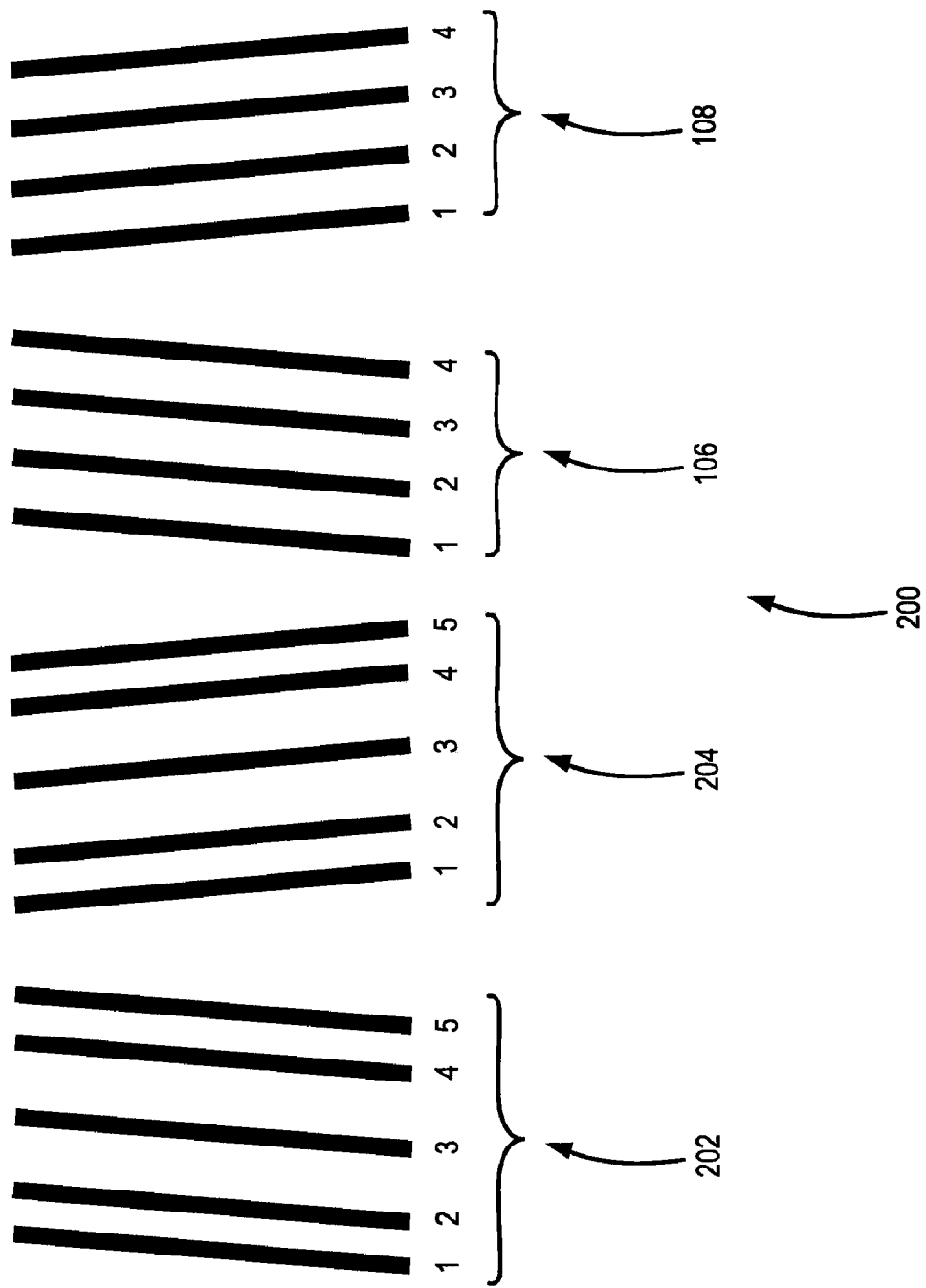
FIG. 2 illustrates a first prior art servo pattern used to encode a single bit of information.

FIG. 2 shows prior art servo pattern 200. The spacings between the pulses in Subframe 1, i.e. bursts 202 and 204, have been altered with respect to the nominal spacings shown in FIG. 1. Using prior art methods, servo pattern 200 encodes one bit of LPOS information, wherein that bit is decoded to comprise a value of "1".

FIG. 3 shows prior art servo pattern 300. The spacings between the pulses in Subframe 1, i.e. bursts 302 and 304, have been altered with respect to the nominal spacing shown in FIG. 1. Using prior art methods, servo pattern 300 encodes one bit of LPOS information, wherein that bit is decoded to comprise a value of "0".

Figure 4A:
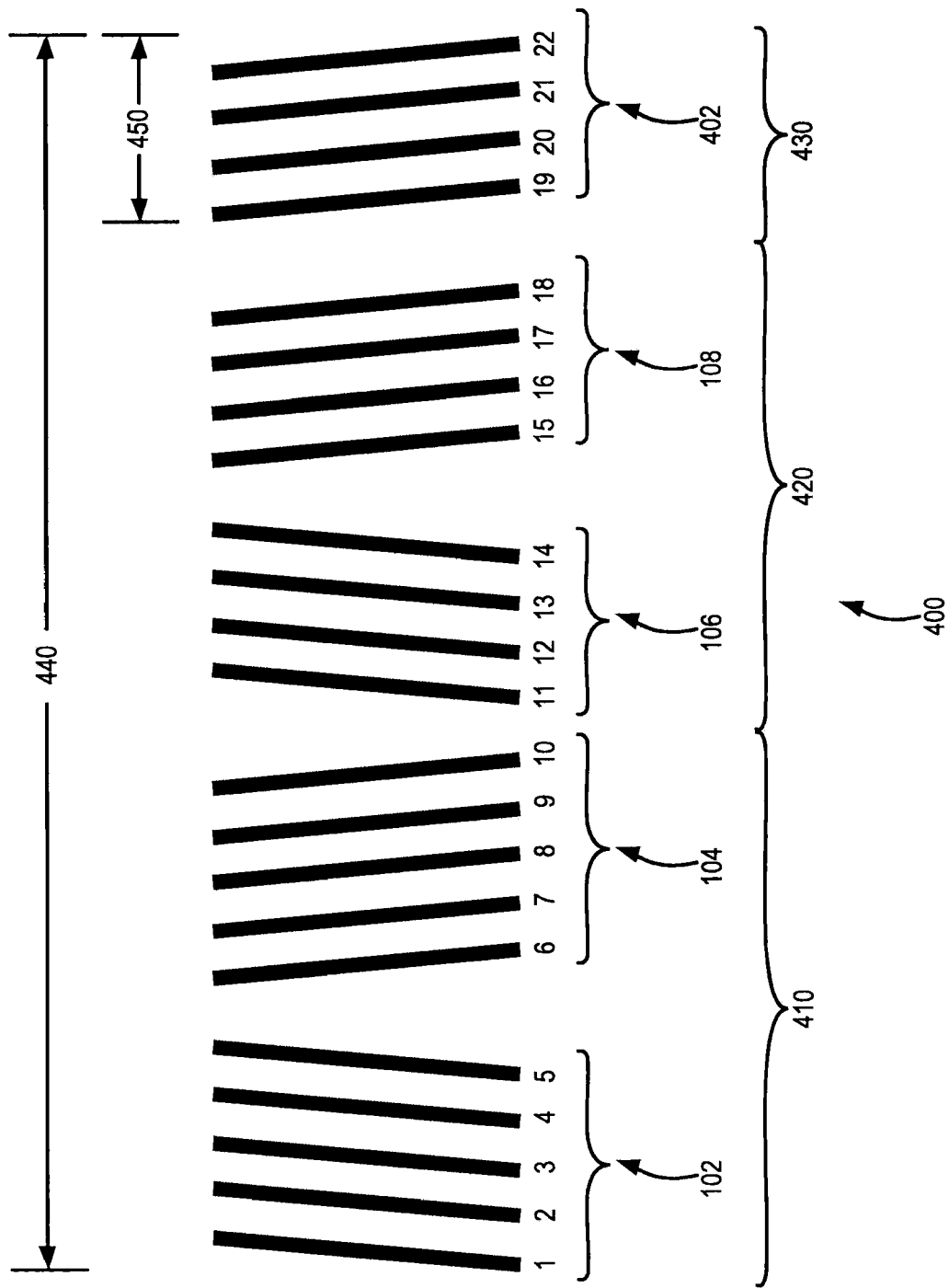
FIG. 4A illustrates Applicant's servo pattern comprising a three subframe architecture, wherein the Subframe 3 comprises (N) pulses and encodes up to (N) bits of information, wherein (N) in FIG. 4A has a value of 4.

Applicant's servo pattern architecture replaces LPOS bit phase encoding with transition encoding. LPOS bits no longer reside in either Subframe 1 or Subframe 2. Rather, LPOS bits are transition encoded in new Subframe 3. Applicant's Subframe 402 comprises (N) pulses, wherein (N) is greater than or equal to 0, and encodes up to (N) LPOS bits. Referring now to FIG. 4A, Applicant's servo pattern 400 comprises a total length 440, wherein Subframe 3, i.e. subframe 402, comprises a length 450. FIG. 4B illustrates sequential storage medium 460, wherein sequential storage medium 460 comprises a first side 462, an opposing second side 464, and a first servo band 466 encoded therein adjacent first side 462. In the illustrated embodiment of FIG. 4B, servo band 466 comprises a plurality of servo patterns 400 (FIG. 4A), including servo patterns 400a, 400b, 400c, 400d, and 400e.

In other embodiments, Applicant's sequential storage medium 460 comprises a second servo band encoded therein adjacent second side 464. FIG. 4B should not be taken as limiting. As a general matter, Applicant's sequential storage medium comprises at least one servo band comprising a plurality of Applicant's servo patterns comprising a third subframe 402.

In certain embodiments, Applicant's third subframe 402 comprises zero pulses. In certain of these embodiments, Applicant's servo pattern comprising a third subframe comprising zero pulses is interleaved with other servo patterns comprising a third subframe comprising one or more pulses.

In other embodiments, Applicant's third subframe 402 comprises one pulse and encodes one bit of LPOS data. That one bit of LPOS data can be encoded based upon the presence of absence of that one pulse in the third subframe, or based upon the width of that one pulse in the third subframe.

In yet other embodiments, Applicant's third subframe 402 comprises up to two pulses and encodes two bits of LPOS data. Those two bits of LPOS data can be encoded based upon the presence of none, one, or both, of the two pulses in the third subframe, or based upon the width of two pulses in the third subframe.

In still other embodiments, Applicant's third subframe 402 comprises up to three pulses and encodes three bits of LPOS data. Those three bits of LPOS data can be encoded based upon the presence of none, one, two, or three pulses in the third subframe, or based upon the width of three pulses in the third subframe.

As a general matter, Applicant's third subframe 402 comprises up to (N) pulses, and encodes up to (N) bits of LPOS data, wherein (N) is greater than or equal to 0. An (i)th LPOS bit can be encoded based upon the presence or absence of a pulse at an (i)th position in a sequence of (N) positions in the third subframe, or based upon the width of an (i)th pulse disposed at an (i)th position in a sequence of (N) positions in the third subframe.

One of ordinary skill in the art will appreciate Applicant's encoding methods based upon the following description of a third subframe 402 comprising between 0 and 4 pulses and encoding 4 LPOS bits. The embodiments of Applicant's invention illustrated in FIGS. 5A, 5B, 6A, 6B, 7A, 7B, 8A, 8B, 9A, 9B, 10A, 10B, 11A, 11B, 12A, 12B, 13A, 13B, 14A, 14B, 15A, 15B, 16A, 16B, 17A, 17B, 18A, 18B, 19A, 19B, 20A, and 20B, and the descriptions of those FIGs. herein, should not be taken as limiting Applicant's third subframe to 4 pulses, or to encoding 4 bits of LPOS data. Rather, Applicant's third subframe comprises (N) pulses, wherein (N) is greater than or equal to 0, and encodes up to (N) bits of LPOS data.

FIG. 5A illustrates embodiment 500 of Applicant's Subframe 3, wherein embodiment 500 encodes a value of "1111." In embodiment 500, Applicant's Subframe 3 comprises pulses 18, 19, 20, and 21, wherein each of those pulses comprises a width of 2 microns, and wherein each pulse is separated from one or two neighboring pulses by a distance of 5 microns.

In the illustrated embodiment of FIG. 5A, pulse 18 of Subframe 500 comprises a first magnetic phase shift 505, a second magnetic phase shift 510, and a width w18 between phase shifts 505 and 510. Pulse 19 of Subframe 500 comprises a third magnetic phase shift 515, a fourth magnetic phase shift 520, and a width w19 between phase shifts 515 and 520. A separation t18 separates first magnetic phase shift 505 and third magnetic phase shift 515. A separation s18 separates second magnetic phase shift 510 and third magnetic phase shift 515.

Pulse 20 of Subframe 500 comprises a fifth magnetic phase shift 525, a sixth magnetic phase shift 530, and a width w20 between phase shifts 525 and 530. A separation t19 separates third magnetic phase shift 515 and fifth magnetic phase shift 525. A separation s19 separates fourth magnetic phase shift 520 and fifth magnetic phase shift 525.

Pulse 21 of Subframe 500 comprises a seventh magnetic phase shift 535, an eighth magnetic phase shift 540, and a width w21 between phase shifts 535 and 540. A separation t20 separates fifth magnetic phase shift 525 and seventh magnetic phase shift 535. A separation s20 separates sixth magnetic phase shift 530 and seventh magnetic phase shift 535.

In the illustrated embodiment of FIG. 5A, w18=w19=w20=w21. In certain embodiments, in Subframe 500 w18=w19=w20=w21=2.0 microns. In the illustrated embodiment of FIG. 5A, t18=t19=t20. In certain embodiments, t18=t19=t20=5 microns. In the illustrated embodiment of FIG. 5A, s18=s19=s20. In certain embodiments, s18=s19=s20=3 microns.

FIG. 5B illustrates embodiment 550 of Applicant's Subframe 3, wherein embodiment 550 encodes a value of "1111." In the illustrated embodiment of FIG. 5B, pulse 18 of Subframe 550 comprises a first magnetic phase shift 555, a second magnetic phase shift 560, and a width w18 between phase shifts 555 and 560. Pulse 19 of Subframe 550 comprises a third magnetic phase shift 565, a fourth magnetic phase shift 570, and a width w19 between phase shifts 565 and 570. A separation t18 separates first magnetic phase shift 555 and third magnetic phase shift 565. A separation s18 separates second magnetic phase shift 560 and third magnetic phase shift 565.

Pulse 20 of Subframe 550 comprises a fifth magnetic phase shift 575, a sixth magnetic phase shift 580, and a width w20 between phase shifts 575 and 580. A separation t19 separates third magnetic phase shift 565 and fifth magnetic phase shift 575. A separation s19 separates fourth magnetic phase shift 570 and fifth magnetic phase shift 575.

Pulse 21 of Subframe 550 comprises a seventh magnetic phase shift 585, an eighth magnetic phase shift 590, and a width w21 between phase shifts 585 and 590. A separation t20 separates fifth magnetic phase shift 575 and seventh magnetic phase shift 585. A separation s20 separates sixth magnetic phase shift 580 and seventh magnetic phase shift 585.

In the illustrated embodiment of FIG. 5B, w18=w19=w20=w21. In certain embodiments, in Subframe 550 w18=w19=w20=w21=2.5 microns. In the illustrated embodiment of FIG. 5B, t18=t19=t20. In certain embodiments in Subframe 550, t18=t19=t20=5 microns. In the illustrated embodiment of FIG. 5B, s18=s19=s20. In certain embodiments in Subframe 550, s18=s19=s20=2.5 microns.

FIG. 6A illustrates embodiment 600 of Applicant's Subframe 3, wherein embodiment 600 encodes a value of "1110." In embodiment 600, Applicant's Subframe 3 comprises three pulses, namely pulses 18, 19, and 20, but not pulse 21. In the illustrated embodiment of FIG. 6A, pulse 18 of Subframe 600 comprises a first magnetic phase shift 605, a second magnetic phase shift 610, and a width w18 between phase shifts 605 and 610. Pulse 19 of Subframe 600 comprises a third magnetic phase shift 615, a fourth magnetic phase shift 620, and a width w19 between phase shifts 615 and 620. A separation t18 separates first magnetic phase shift 605 and third magnetic phase shift 615. A separation s18 separates second magnetic phase shift 610 and third magnetic phase shift 615.

Pulse 20 of Subframe 600 comprises a fifth magnetic phase shift 625, a sixth magnetic phase shift 630, and a width w20 between phase shifts 625 and 630. A separation t19 separates third magnetic phase shift 615 and fifth magnetic phase shift 625. A separation s19 separates fourth magnetic phase shift 620 and fifth magnetic phase shift 625.

In the illustrated embodiment of FIG. 6A, w18=w19=w20. In certain embodiments, in Subframe 500 w18=w19=w20=2.0 microns. In the illustrated embodiment of FIG. 5A, t18=t19. In certain embodiments, t18=t19=5 microns. In the illustrated embodiment of FIG. 5A, s18=s19. In certain embodiments, s18=s19=3 microns.

FIG. 6B illustrates embodiment 650 of Applicant's Subframe 3, wherein embodiment 650 encodes a value of "1110." In the illustrated embodiment of FIG. 6B, pulse 18 of Subframe 650 comprises a first magnetic phase shift 655, a second magnetic phase shift 660, and a width w18 between phase shifts 655 and 660. Pulse 19 of Subframe 650 comprises a third magnetic phase shift 665, a fourth magnetic phase shift 670, and a width w19 between phase shifts 665 and 670. A separation t18 separates first magnetic phase shift 655 and third magnetic phase shift 665. A separation s18 separates second magnetic phase shift 650 and third magnetic phase shift 665.

Pulse 20 of Subframe 650 comprises a fifth magnetic phase shift 675, a sixth magnetic phase shift 680, and a width w20 between phase shifts 675 and 680. A separation t19 separates third magnetic phase shift 665 and fifth magnetic phase shift 675. A separation s19 separates fourth magnetic phase shift 670 and fifth magnetic phase shift 675.

Pulse 21 of Subframe 650 comprises a seventh magnetic phase shift 685, an eighth magnetic phase shift 690, and a width w21 between phase shifts 685 and 690. A separation t20 separates fifth magnetic phase shift 675 and seventh magnetic phase shift 685. A separation s20 separates sixth magnetic phase shift 680 and seventh magnetic phase shift 685.

In the illustrated embodiment of FIG. 6B, w18=w19=w20. In certain embodiments, in Subframe 650 w18=w19=w20=2.5 microns. In certain embodiments, width 21 in Subframe 650 equals 2.0 microns. In the illustrated embodiment of FIG. 6B, t18=t19=t20. In certain embodiments, t18=t19=t20=5 microns. In the illustrated embodiment of FIG. 6B, s18=s19=s20. In certain embodiments, s18=s19=s20=2.5 microns.

FIG. 7A illustrates embodiment 700 of Applicant's Subframe 3, wherein embodiment 700 encodes a value of "1100." In embodiment 700, Applicant's Subframe 3 comprises two pulses, namely pulses 18 and 19, but not pulses 20 and 21. In the illustrated embodiment of FIG. 7A, pulse 18 of Subframe 700 comprises a first magnetic phase shift 705, a second magnetic phase shift 710, and a width w18 between phase shifts 705 and 710. Pulse 19 of Subframe 700 comprises a third magnetic phase shift 715, a fourth magnetic phase shift 720, and a width w19 between phase shifts 715 and 720. A separation t18 separates first magnetic phase shift 705 and third magnetic phase shift 715. A separation s18 separates second magnetic phase shift 710 and third magnetic phase shift 715.

In the illustrated embodiment of FIG. 7A, w18=w19. In certain embodiments, in Subframe 700 w18=w19=2.0 microns. In the illustrated embodiment of FIG. 7A, t18=5 microns. In the illustrated embodiment of FIG. 7A, s18=3 microns.

FIG. 7B illustrates embodiment 750 of Applicant's Subframe 3, wherein embodiment 750 encodes a value of "1100." In the illustrated embodiment of FIG. 7B, pulse 18 of Subframe 750 comprises a first magnetic phase shift 755, a second magnetic phase shift 760, and a width w18 between phase shifts 755 and 760. Pulse 19 of Subframe 750 comprises a third magnetic phase shift 765, a fourth magnetic phase shift 770, and a width w19 between phase shifts 765 and 770. A separation t18 separates first magnetic phase shift 755 and third magnetic phase shift 765. A separation s18 separates second magnetic phase shift 760 and third magnetic phase shift 765.

Pulse 20 of Subframe 750 comprises a fifth magnetic phase shift 775, a sixth magnetic phase shift 780, and a width w20 between phase shifts 775 and 780. A separation t19 separates third magnetic phase shift 765 and fifth magnetic phase shift 775. A separation s19 separates fourth magnetic phase shift 770 and fifth magnetic phase shift 775.

Pulse 21 of Subframe 750 comprises a seventh magnetic phase shift 785, an eighth magnetic phase shift 790, and a width w21 between phase shifts 785 and 790. A separation t20 separates fifth magnetic phase shift 775 and seventh magnetic phase shift 785. A separation s20 separates sixth magnetic phase shift 780 and seventh magnetic phase shift 785.

In the illustrated embodiment of FIG. 7B, w18=w19, and w20=w21. In certain embodiments, in Subframe 750 w18=w19=2.5 microns. In certain embodiments, in Subframe 750 w20=w21=2.0 microns.

In the illustrated embodiment of FIG. 7B, t18=t19=t20. In certain embodiments, t18=t19=t20=5 microns. In the illustrated embodiment of FIG. 7B, s18=s19. In certain embodiments, s18=s19=2.5 microns. In certain embodiments in Subframe 750, s20=3.0 microns.

FIG. 8A illustrates embodiment 800 of Applicant's Subframe 3, wherein embodiment 800 encodes a value of "1000." In embodiment 800, Applicant's Subframe 3 comprises one pulse, namely pulse 18, but not pulses 19, 20, and 21. In the illustrated embodiment of FIG. 8A, pulse 18 of Subframe 800 comprises a first magnetic phase shift 805, a second magnetic phase shift 810, and a width w18 between phase shifts 805 and 810. In the illustrated embodiment of FIG. 8A, w18=2.0 microns.

FIG. 8B illustrates embodiment 850 of Applicant's Subframe 3, wherein embodiment 850 encodes a value of "1000." In the illustrated embodiment of FIG. 8B, pulse 18 of Subframe 850 comprises a first magnetic phase shift 855, a second magnetic phase shift 860, and a width w18 between phase shifts 855 and 860. Pulse 19 of Subframe 850 comprises a third magnetic phase shift 865, a fourth magnetic phase shift 870, and a width w19 between phase shifts 865 and 870. A separation t18 separates first magnetic phase shift 855 and third magnetic phase shift 865. A separation s18 separates second magnetic phase shift 860 and third magnetic phase shift 865.

Pulse 20 of Subframe 850 comprises a fifth magnetic phase shift 875, a sixth magnetic phase shift 880, and a width w20 between phase shifts 875 and 880. A separation t19 separates third magnetic phase shift 865 and fifth magnetic phase shift 875. A separation s19 separates fourth magnetic phase shift 870 and fifth magnetic phase shift 875.

Pulse 21 of Subframe 850 comprises a seventh magnetic phase shift 885, an eighth magnetic phase shift 890, and a width w21 between phase shifts 885 and 890. A separation t20 separates fifth magnetic phase shift 875 and seventh magnetic phase shift 885. A separation s20 separates sixth magnetic phase shift 880 and seventh magnetic phase shift 885.

In the illustrated embodiment of FIG. 8B, w19=w20=w21. In certain embodiments, in Subframe 850 w19=w20=w21=2.0 microns. In certain embodiments, in Subframe 850 w18=2.5 microns.

In the illustrated embodiment of FIG. 8B, t18=t19=t20. In certain embodiments, t18=t19=t20=5 microns. In the illustrated embodiment of FIG. 8B, s19=s20. In certain embodiments, s19=s20=3.0 microns. In certain embodiments in Subframe 850, s18=2.5 microns.

FIG. 9A illustrates embodiment 900 of Applicant's Subframe 3, wherein embodiment 900 encodes a value of "1101." In embodiment 900, Applicant's Subframe 3 comprises three pulses, namely pulses 18, 19, and 21, but not pulse 20.

In the illustrated embodiment of FIG. 9A, pulse 18 of Subframe 900 comprises a first magnetic phase shift 905, a second magnetic phase shift 910, and a width w18 between phase shifts 905 and 910. Pulse 19 of Subframe 900 comprises a third magnetic phase shift 915, a fourth magnetic phase shift 920, and a width w19 between phase shifts 915 and 920. A separation t18 separates first magnetic phase shift 905 and third magnetic phase shift 915. A separation s18 separates second magnetic phase shift 910 and third magnetic phase shift 915.

Pulse 21 of Subframe 900 comprises a fifth magnetic phase shift 925, a sixth magnetic phase shift 930, and a width w21 between phase shifts 925 and 930. A separation t19 separates third magnetic phase shift 915 and fifth magnetic phase shift 925. A separation s19 separates fourth magnetic phase shift 920 and fifth magnetic phase shift 925.

In the illustrated embodiment of FIG. 9A, w18=w19=w21. In certain embodiments, in Subframe 900 w18=w19=w21=2.0 microns. In the illustrated embodiment of FIG. 9A, t18=5 microns, and t19=10 microns. In the illustrated embodiment of FIG. 9A, s18=3 microns, and s19 equals 8 microns.

FIG. 9B illustrates embodiment 950 of Applicant's Subframe 3, wherein embodiment 950 encodes a value of "1101." In the illustrated embodiment of FIG. 9B, pulse 18 of Subframe 950 comprises a first magnetic phase shift 955, a second magnetic phase shift 960, and a width w18 between phase shifts 955 and 960. Pulse 19 of Subframe 950 comprises a third magnetic phase shift 965, a fourth magnetic phase shift 970, and a width w19 between phase shifts 965 and 970. A separation t18 separates first magnetic phase shift 955 and third magnetic phase shift 965. A separation s18 separates second magnetic phase shift 960 and third magnetic phase shift 965.

Pulse 20 of Subframe 950 comprises a fifth magnetic phase shift 975, a sixth magnetic phase shift 980, and a width w20 between phase shifts 975 and 980. A separation t19 separates third magnetic phase shift 965 and fifth magnetic phase shift 975. A separation s19 separates fourth magnetic phase shift 970 and fifth magnetic phase shift 975.

Pulse 21 of Subframe 950 comprises a seventh magnetic phase shift 985, an eighth magnetic phase shift 990, and a width w21 between phase shifts 985 and 990. A separation t20 separates fifth magnetic phase shift 975 and seventh magnetic phase shift 985. A separation s20 separates sixth magnetic phase shift 980 and seventh magnetic phase shift 985.

In the illustrated embodiment of FIG. 9B, w18=w19=w21. In certain embodiments, in Subframe 950 w18=w19=w21=2.5 microns. In certain embodiments, in Subframe 950 w20=2.0 microns. In the illustrated embodiment of FIG. 9B, t18=t19=t20. In certain embodiments in Subframe 950, t18=t19=t20=5 microns. In the illustrated embodiment of FIG. 9B, s18=s19. In certain embodiments in Subframe 950, s18=s19=2.5 microns. In certain embodiments in Subframe 950, s20=3.0 microns.

FIG. 10A illustrates embodiment 1000 of Applicant's Subframe 3, wherein embodiment 1000 encodes a value of "1001." In embodiment 1000, Applicant's Subframe 3 comprises two pulses, namely pulses 18, and 21, but not pulses 19 and 20.

In the illustrated embodiment of FIG. 10A, pulse 18 of Subframe 1000 comprises a first magnetic phase shift 1005, a second magnetic phase shift 1010, and a width w18 between phase shifts 1005 and 1010. Pulse 21 of Subframe 1000 comprises a third magnetic phase shift 1015, a fourth magnetic phase shift 1020, and a width w21 between phase shifts 1015 and 1020. A separation t18 separates first magnetic phase shift 1005 and third magnetic phase shift 1015. A separation s18 separates second magnetic phase shift 1010 and third magnetic phase shift 1015.

In the illustrated embodiment of FIG. 10A, w18=w21. In certain embodiments, in Subframe 1000 w18=w21=2.0 microns. In the illustrated embodiment of FIG. 10A, t18=13 microns.

FIG. 10B illustrates embodiment 1050 of Applicant's Subframe 3, wherein embodiment 1050 encodes a value of "1001." In the illustrated embodiment of FIG. 10B, pulse 18 of Subframe 1050 comprises a first magnetic phase shift 1055, a second magnetic phase shift 1060, and a width w18 between phase shifts 1055 and 1060. Pulse 19 of Subframe 1050 comprises a third magnetic phase shift 1065, a fourth magnetic phase shift 1070, and a width w19 between phase shifts 1065 and 1070. A separation t18 separates first magnetic phase shift 1055 and third magnetic phase shift 1065. A separation s18 separates second magnetic phase shift 1060 and third magnetic phase shift 1065.

Pulse 20 of Subframe 1050 comprises a fifth magnetic phase shift 1075, a sixth magnetic phase shift 1080, and a width w20 between phase shifts 1075 and 1080. A separation t19 separates third magnetic phase shift 1065 and fifth magnetic phase shift 1075. A separation s19 separates fourth magnetic phase shift 1070 and fifth magnetic phase shift 1075.

Pulse 21 of Subframe 1050 comprises a seventh magnetic phase shift 1085, an eighth magnetic phase shift 1090, and a width w21 between phase shifts 1085 and 1090. A separation t20 separates fifth magnetic phase shift 1075 and seventh magnetic phase shift 1085. A separation s20 separates sixth magnetic phase shift 1080 and seventh magnetic phase shift 1085.

In the illustrated embodiment of FIG. 10B, w18=w21, and w19=w20. In certain embodiments, in Subframe 1050 w18=w21=2.5 microns. In certain embodiments, in Subframe 1050 w19=w20=2.0 microns.

In the illustrated embodiment of FIG. 10B, t18=t19=t20. In certain embodiments in Subframe 1050, t18=t19=t20=5 microns. In the illustrated embodiment of FIG. 10B, s18=2.5 microns. In certain embodiments in Subframe 1050, s19=s20=3.0 microns.

FIG. 11A illustrates embodiment 1100 of Applicant's Subframe 3, wherein embodiment 1100 encodes a value of "1011." In embodiment 1100, Applicant's Subframe 3 comprises three pulses, namely pulses 18, 20, and 21, but not pulse 19.

In the illustrated embodiment of FIG. 11A, pulse 18 of Subframe 1100 comprises a first magnetic phase shift 1105, a second magnetic phase shift 1110, and a width w18 between phase shifts 1105 and 1110. Pulse 20 of Subframe 1100 comprises a third magnetic phase shift 1115, a fourth magnetic phase shift 1120, and a width w20 between phase shifts 1115 and 1120. A separation t18 separates first magnetic phase shift 1105 and third magnetic phase shift 1115. A separation s18 separates second magnetic phase shift 1110 and third magnetic phase shift 1115.

Pulse 21 of Subframe 1100 comprises a fifth magnetic phase shift 1125, a sixth magnetic phase shift 1130, and a width w21 between phase shifts 1125 and 1130. A separation t20 separates third magnetic phase shift 1115 and fifth magnetic phase shift 1125. A separation s20 separates fourth magnetic phase shift 1120 and fifth magnetic phase shift 1125.

In the illustrated embodiment of FIG. 11A, w18=w20=w21. In certain embodiments, in Subframe 1100 w18=w20=w21=2.0 microns. In the illustrated embodiment of FIG. 11A, t18=10 microns, and t20=5 microns. In the illustrated embodiment of FIG. 11A, s18=8.0 microns, and s20 equals 3.0 microns.

FIG. 11B illustrates embodiment 1150 of Applicant's Subframe 3, wherein embodiment 1150 encodes a value of "1101." In the illustrated embodiment of FIG. 11B, pulse 18 of Subframe 1150 comprises a first magnetic phase shift 1155, a second magnetic phase shift 1160, and a width w18 between phase shifts 1155 and 1160. Pulse 19 of Subframe 1150 comprises a third magnetic phase shift 1165, a fourth magnetic phase shift 1170, and a width w19 between phase shifts 1165 and 1170. A separation t18 separates first magnetic phase shift 1155 and third magnetic phase shift 1165. A separation s18 separates second magnetic phase shift 1160 and third magnetic phase shift 1165.

Pulse 20 of Subframe 1150 comprises a fifth magnetic phase shift 1175, a sixth magnetic phase shift 1180, and a width w20 between phase shifts 1175 and 1180. A separation t19 separates third magnetic phase shift 1165 and fifth magnetic phase shift 1175. A separation s19 separates fourth magnetic phase shift 1170 and fifth magnetic phase shift 1175.

Pulse 21 of Subframe 1150 comprises a seventh magnetic phase shift 1185, an eighth magnetic phase shift 1190, and a width w21 between phase shifts 1185 and 1190. A separation t20 separates fifth magnetic phase shift 1175 and seventh magnetic phase shift 1185. A separation s20 separates sixth magnetic phase shift 1180 and seventh magnetic phase shift 1185.

In the illustrated embodiment of FIG. 11B, w18=w20=w21. In certain embodiments, in Subframe 1150 w18=w20=w21=2.5 microns. In certain embodiments, in Subframe 1150 w19=2.0 microns.

In the illustrated embodiment of FIG. 11B, t18=t19=t20. In certain embodiments in Subframe 1150, t18=t19=t20=5 microns. In the illustrated embodiment of FIG. 11B, s18=s20. In certain embodiments in Subframe 1150, s18 s20=2.5 microns. In certain embodiments in Subframe 1150, s19=3.0 microns.

FIG. 12A illustrates embodiment 1200 of Applicant's Subframe 3, wherein embodiment 1200 encodes a value of "0011." In embodiment 1200, Applicant's Subframe 3 comprises two pulses, namely pulses 20 and 21, but not pulses 18 and 19.

In the illustrated embodiment of FIG. 12A, pulse 20 of Subframe 1200 comprises a first magnetic phase shift 1205, a second magnetic phase shift 1210, and a width w20 between phase shifts 1205 and 1210. Pulse 21 of Subframe 1200 comprises a third magnetic phase shift 1215, a fourth magnetic phase shift 1220, and a width w21 between phase shifts 1215 and 1220. A separation t20 separates first magnetic phase shift 1205 and third magnetic phase shift 1215. A separation s20 separates second magnetic phase shift 1210 and third magnetic phase shift 1215.

In the illustrated embodiment of FIG. 12A, w20=w21. In certain embodiments, in Subframe 1200 w20=w21=2.0 microns. In the illustrated embodiment of FIG. 12A, t20=5 microns. In the illustrated embodiment of FIG. 12A, s20 equals 3.0 microns.

FIG. 12B illustrates embodiment 1250 of Applicant's Subframe 3, wherein embodiment 1250 encodes a value of "0011." In the illustrated embodiment of FIG. 12B, pulse 18 of Subframe 1250 comprises a first magnetic phase shift 1255, a second magnetic phase shift 1260, and a width w18 between phase shifts 1255 and 1260. Pulse 19 of Subframe 1250 comprises a third magnetic phase shift 1265, a fourth magnetic phase shift 1270, and a width w19 between phase shifts 1265 and 1270. A separation t18 separates first magnetic phase shift 1255 and third magnetic phase shift 1265. A separation s18 separates second magnetic phase shift 1260 and third magnetic phase shift 1265.

Pulse 20 of Subframe 1250 comprises a fifth magnetic phase shift 1275, a sixth magnetic phase shift 1280, and a width w20 between phase shifts 1275 and 1280. A separation t19 separates third magnetic phase shift 1265 and fifth magnetic phase shift 1275. A separation s19 separates fourth magnetic phase shift 1270 and fifth magnetic phase shift 1275.

Pulse 21 of Subframe 1250 comprises a seventh magnetic phase shift 1285, an eighth magnetic phase shift 1290, and a width w21 between phase shifts 1285 and 1290. A separation t20 separates fifth magnetic phase shift 1275 and seventh magnetic phase shift 1285. A separation s20 separates sixth magnetic phase shift 1280 and seventh magnetic phase shift 1285.

In the illustrated embodiment of FIG. 12B, w18=w19, and w20=w21. In certain embodiments, in Subframe 1250 w18=w19=2.0 microns. In certain embodiments, in Subframe 1250 w20=w21=2.5 microns.

In the illustrated embodiment of FIG. 12B, t18=t19=t20. In certain embodiments in Subframe 1250, t18=t19=t20=5 microns. In the illustrated embodiment of FIG. 12B, s18=s19. In certain embodiments in Subframe 1250, s18=s19=3.0 microns. In certain embodiments in Subframe 1250, s20=2.5 microns.

FIG. 13A illustrates embodiment 1300 of Applicant's Subframe 3, wherein embodiment 1300 encodes a value of "0111." In embodiment 1300, Applicant's Subframe 3 comprises three pulses, namely pulses 19, 20, and 21, but not pulse 18.

In the illustrated embodiment of FIG. 13A, pulse 19 of Subframe 1300 comprises a first magnetic phase shift 1305, a second magnetic phase shift 1310, and a width w19 between phase shifts 1305 and 1310. Pulse 20 of Subframe 1300 comprises a third magnetic phase shift 1315, a fourth magnetic phase shift 1320, and a width w20 between phase shifts 1315 and 1320. A separation t19 separates first magnetic phase shift 1305 and third magnetic phase shift 1315. A separation s19 separates second magnetic phase shift 1310 and third magnetic phase shift 1315.

Pulse 21 of Subframe 1300 comprises a fifth magnetic phase shift 1325, a sixth magnetic phase shift 1330, and a width w21 between phase shifts 1325 and 1330. A separation t20 separates third magnetic phase shift 1315 and fifth magnetic phase shift 1325. A separation s20 separates fourth magnetic phase shift 1320 and fifth magnetic phase shift 1325.

In the illustrated embodiment of FIG. 13A, w19=w20=w21. In certain embodiments, in Subframe 1300 w19=w20=w21=2.0 microns. In the illustrated embodiment of FIG. 13A, t19=t20. In certain embodiments, t19=t20=5 microns. In the illustrated embodiment of FIG. 13A, s19=s20. In certain embodiments, s19=s20=3 microns.

FIG. 13B illustrates embodiment 1350 of Applicant's Subframe 3, wherein embodiment 1350 encodes a value of "0111." In the illustrated embodiment of FIG. 13B, pulse 18 of Subframe 1350 comprises a first magnetic phase shift 1355, a second magnetic phase shift 1360, and a width w18 between phase shifts 1355 and 1360. Pulse 19 of Subframe 1350 comprises a third magnetic phase shift 1365, a fourth magnetic phase shift 1370, and a width w19 between phase shifts 1365 and 1370. A separation t18 separates first magnetic phase shift 1355 and third magnetic phase shift 1365. A separation s18 separates second magnetic phase shift 1360 and third magnetic phase shift 1365.

Pulse 20 of Subframe 1350 comprises a fifth magnetic phase shift 1375, a sixth magnetic phase shift 1380, and a width w20 between phase shifts 1375 and 1380. A separation t19 separates third magnetic phase shift 1365 and fifth magnetic phase shift 1375. A separation s19 separates fourth magnetic phase shift 1370 and fifth magnetic phase shift 1375.

Pulse 21 of Subframe 1350 comprises a seventh magnetic phase shift 1385, an eighth magnetic phase shift 1390, and a width w21 between phase shifts 1385 and 1390. A separation t20 separates fifth magnetic phase shift 1375 and seventh magnetic phase shift 1385. A separation s20 separates sixth magnetic phase shift 1380 and seventh magnetic phase shift 1385.

In the illustrated embodiment of FIG. 13B, w19=w20=w21. In certain embodiments, in Subframe 1350 w19=w20=w21=2.5 microns. In certain embodiments, in Subframe 1350 w18=2.0 microns.

In the illustrated embodiment of FIG. 13B, t18=t19=t20. In certain embodiments in Subframe 1350, t18=t19=t20=5 microns. In the illustrated embodiment of FIG. 13B, s19=s20. In certain embodiments in Subframe 1350, s19=s20=2.5 microns. In certain embodiments in Subframe 1350, s18=3.0 microns.

FIG. 14A illustrates embodiment 1400 of Applicant's Subframe 3, wherein embodiment 1400 encodes a value of "0101." In embodiment 1400, Applicant's Subframe 3 comprises two pulses, namely pulses 19 and 21, but not pulses 18 and 20.

In the illustrated embodiment of FIG. 14A, pulse 19 of Subframe 1400 comprises a first magnetic phase shift 1405, a second magnetic phase shift 1410, and a width w19 between phase shifts 1405 and 1410. Pulse 21 of Subframe 1400 comprises a third magnetic phase shift 1415, a fourth magnetic phase shift 1420, and a width w21 between phase shifts 1415 and 1420. A separation t19 separates first magnetic phase shift 1405 and third magnetic phase shift 1415. A separation s19 separates second magnetic phase shift 1410 and third magnetic phase shift 1415.

In the illustrated embodiment of FIG. 14A, w19=w21. In certain embodiments, in Subframe 1400 w19=w21=2.0 microns. In certain embodiments, t19=10 microns. In the illustrated embodiment of FIG. 14A, s19=8 microns.

FIG. 14B illustrates embodiment 1450 of Applicant's Subframe 3, wherein embodiment 1450 encodes a value of "0101." In the illustrated embodiment of FIG. 14B, pulse 18 of Subframe 1450 comprises a first magnetic phase shift 1455, a second magnetic phase shift 1460, and a width w18 between phase shifts 1455 and 1460. Pulse 19 of Subframe 1450 comprises a third magnetic phase shift 1465, a fourth magnetic phase shift 1470, and a width w19 between phase shifts 1465 and 1470. A separation t18 separates first magnetic phase shift 1455 and third magnetic phase shift 1465. A separation s18 separates second magnetic phase shift 1460 and third magnetic phase shift 1465.

Pulse 20 of Subframe 1450 comprises a fifth magnetic phase shift 1475, a sixth magnetic phase shift 1480, and a width w20 between phase shifts 1475 and 1480. A separation t19 separates third magnetic phase shift 1465 and fifth magnetic phase shift 1475. A separation s19 separates fourth magnetic phase shift 1470 and fifth magnetic phase shift 1475.

Pulse 21 of Subframe 1450 comprises a seventh magnetic phase shift 1485, an eighth magnetic phase shift 1490, and a width w21 between phase shifts 1485 and 1490. A separation t20 separates fifth magnetic phase shift 1475 and seventh magnetic phase shift 1485. A separation s20 separates sixth magnetic phase shift 1480 and seventh magnetic phase shift 1485.

In the illustrated embodiment of FIG. 14B, w19=w21, and w18=w20. In certain embodiments, in Subframe 1450 w18=w20=2.0 microns. In certain embodiments, in Subframe 1450 w19=w21=2.5 microns.

In the illustrated embodiment of FIG. 14B, t18=t19=t20. In certain embodiments in Subframe 1450, t18=t19=t20=5 microns. In the illustrated embodiment of FIG. 14B, s18=s20. In certain embodiments in Subframe 1450, s18=s20=3.0 microns. In certain embodiments in Subframe 1450, s19=2.5 microns.

FIG. 15A illustrates embodiment 1500 of Applicant's Subframe 3, wherein embodiment 1500 encodes a value of "0100." In embodiment 1500, Applicant's Subframe 3 comprises one pulses, namely pulse 19, but not pulses 18, 19, and 20.

In the illustrated embodiment of FIG. 15A, pulse 19 of Subframe 1500 comprises a first magnetic phase shift 1505, a second magnetic phase shift 1510, and a width w19 between phase shifts 1505 and 1510. In the illustrated embodiment of FIG. 15A, w19=2.0 microns.

FIG. 15B illustrates embodiment 1550 of Applicant's Subframe 3, wherein embodiment 1550 encodes a value of "0100." In the illustrated embodiment of FIG. 15B, pulse 18 of Subframe 1550 comprises a first magnetic phase shift 1555, a second magnetic phase shift 1560, and a width w18 between phase shifts 1555 and 1560. Pulse 19 of Subframe 1550 comprises a third magnetic phase shift 1565, a fourth magnetic phase shift 1570, and a width w19 between phase shifts 1565 and 1570. A separation t18 separates first magnetic phase shift 1555 and third magnetic phase shift 1565. A separation s18 separates second magnetic phase shift 1560 and third magnetic phase shift 1565.

Pulse 20 of Subframe 1550 comprises a fifth magnetic phase shift 1575, a sixth magnetic phase shift 1580, and a width w20 between phase shifts 1575 and 1580. A separation t19 separates third magnetic phase shift 1565 and fifth magnetic phase shift 1575. A separation s19 separates fourth magnetic phase shift 1570 and fifth magnetic phase shift 1575.

Pulse 21 of Subframe 1550 comprises a seventh magnetic phase shift 1585, an eighth magnetic phase shift 1590, and a width w21 between phase shifts 1585 and 1590. A separation t20 separates fifth magnetic phase shift 1575 and seventh magnetic phase shift 1585. A separation s20 separates sixth magnetic phase shift 1580 and seventh magnetic phase shift 1585.

In the illustrated embodiment of FIG. 15B, w18=w20=w21. In certain embodiments, in Subframe 1550 w18=w20=w21=2.0 microns. In certain embodiments, in Subframe 1550 w19=2.5 microns.

In the illustrated embodiment of FIG. 15B, t18=t19=t20. In certain embodiments in Subframe 1550, t18=t19=t20=5 microns. In the illustrated embodiment of FIG. 15B, s18=s20. In certain embodiments in Subframe 1550, s18=s20=3.0 microns. In certain embodiments in Subframe 1550, s19=2.5 microns.

FIG. 16A illustrates embodiment 1600 of Applicant's Subframe 3, wherein embodiment 1600 encodes a value of "0010." In embodiment 1600, Applicant's Subframe 3 comprises one pulse, namely pulse 20, but not pulses 18, 19, and 21.

In the illustrated embodiment of FIG. 16A, pulse 20 of Subframe 1600 comprises a first magnetic phase shift 1605, a second magnetic phase shift 1610, and a width w20 between phase shifts 1605 and 1610. In the illustrated embodiment of FIG. 16A, w20=2.0 microns.

FIG. 16B illustrates embodiment 1650 of Applicant's Subframe 3, wherein embodiment 1650 encodes a value of "0010." In the illustrated embodiment of FIG. 16B, pulse 18 of Subframe 1650 comprises a first magnetic phase shift 1655, a second magnetic phase shift 1660, and a width w18 between phase shifts 1655 and 1660. Pulse 19 of Subframe 1650 comprises a third magnetic phase shift 1665, a fourth magnetic phase shift 1670, and a width w19 between phase shifts 1665 and 1670. A separation t18 separates first magnetic phase shift 1655 and third magnetic phase shift 1665. A separation s18 separates second magnetic phase shift 1660 and third magnetic phase shift 1665.

Pulse 20 of Subframe 1650 comprises a fifth magnetic phase shift 1675, a sixth magnetic phase shift 1680, and a width w20 between phase shifts 1675 and 1680. A separation t19 separates third magnetic phase shift 1665 and fifth magnetic phase shift 1675. A separation s19 separates fourth magnetic phase shift 1670 and fifth magnetic phase shift 1675.

Pulse 21 of Subframe 1650 comprises a seventh magnetic phase shift 1685, an eighth magnetic phase shift 1690, and a width w21 between phase shifts 1685 and 1690. A separation t20 separates fifth magnetic phase shift 1675 and seventh magnetic phase shift 1685. A separation s20 separates sixth magnetic phase shift 1680 and seventh magnetic phase shift 1685.

In the illustrated embodiment of FIG. 16B, w18=w19=w21. In certain embodiments, in Subframe 1650 w18=w19=w21=2.0 microns. In certain embodiments, in Subframe 1650 w20=2.5 microns.

In the illustrated embodiment of FIG. 16B, t18=t19=t20. In certain embodiments in Subframe 1650, t18=t19=t20=5 microns. In the illustrated embodiment of FIG. 16B, s18=s19.

In certain embodiments in Subframe 1650, s18=s19=3.0 microns. In certain embodiments in Subframe 1650, s20=2.5 microns.

FIG. 17A illustrates embodiment 1700 of Applicant's Subframe 3, wherein embodiment 1700 encodes a value of "0001." In embodiment 1700, Applicant's Subframe 3 comprises one pulse, namely pulse 21, but not pulses 18, 19, and 20.

In the illustrated embodiment of FIG. 17A, pulse 21 of Subframe 1700 comprises a first magnetic phase shift 1705, a second magnetic phase shift 1710, and a width w21 between phase shifts 1705 and 1710. In the illustrated embodiment of FIG. 17A, w21=2.0 microns.

FIG. 17B illustrates embodiment 1750 of Applicant's Subframe 3, wherein embodiment 1750 encodes a value of "0001." In the illustrated embodiment of FIG. 17B, pulse 18 of Subframe 1750 comprises a first magnetic phase shift 1755, a second magnetic phase shift 1760, and a width w18 between phase shifts 1755 and 1760. Pulse 19 of Subframe 1750 comprises a third magnetic phase shift 1765, a fourth magnetic phase shift 1770, and a width w19 between phase shifts 1765 and 1770. A separation t18 separates first magnetic phase shift 1755 and third magnetic phase shift 1765. A separation s18 separates second magnetic phase shift 1760 and third magnetic phase shift 1765.

Pulse 20 of Subframe 1750 comprises a fifth magnetic phase shift 1775, a sixth magnetic phase shift 1780, and a width w20 between phase shifts 1775 and 1780. A separation t19 separates third magnetic phase shift 1765 and fifth magnetic phase shift 1775. A separation s19 separates fourth magnetic phase shift 1770 and fifth magnetic phase shift 1775.

Pulse 21 of Subframe 1750 comprises a seventh magnetic phase shift 1785, an eighth magnetic phase shift 1790, and a width w21 between phase shifts 1785 and 1790. A separation t20 separates fifth magnetic phase shift 1775 and seventh magnetic phase shift 1785. A separation s20 separates sixth magnetic phase shift 1780 and seventh magnetic phase shift 1785.

In the illustrated embodiment of FIG. 17B, w18=w19=w20. In certain embodiments, in Subframe 1750 w18=w19=w20=2.0 microns. In certain embodiments, in Subframe 1750 w21=2.5 microns.

In the illustrated embodiment of FIG. 17B, t18=t19=t20. In certain embodiments in Subframe 1750, t18=t19=t20=5 microns. In the illustrated embodiment of FIG. 17B, s18=s19=s20. In certain embodiments in Subframe 1750, s18=s19=s20=3.0 microns.

FIG. 18A illustrates embodiment 1800 of Applicant's Subframe 3, wherein embodiment 1800 encodes a value of "0000." In embodiment 1800, Applicant's Subframe 3 comprises no pulses.

FIG. 18B illustrates embodiment 1850 of Applicant's Subframe 3, wherein embodiment 1850 encodes a value of "0000." In the illustrated embodiment of FIG. 18B, pulse 18 of Subframe 1850 comprises a first magnetic phase shift 1855, a second magnetic phase shift 1860, and a width w18 between phase shifts 1855 and 1860. Pulse 19 of Subframe 1850 comprises a third magnetic phase shift 1865, a fourth magnetic phase shift 1870, and a width w19 between phase shifts 1865 and 1870. A separation t18 separates first magnetic phase shift 1855 and third magnetic phase shift 1865. A separation s18 separates second magnetic phase shift 1860 and third magnetic phase shift 1865.

Pulse 20 of Subframe 1850 comprises a fifth magnetic phase shift 1875, a sixth magnetic phase shift 1880, and a width w20 between phase shifts 1875 and 1880. A separation t19 separates third magnetic phase shift 1865 and fifth magnetic phase shift 1875. A separation s19 separates fourth magnetic phase shift 1870 and fifth magnetic phase shift 1875.

Pulse 21 of Subframe 1850 comprises a seventh magnetic phase shift 1885, an eighth magnetic phase shift 1890, and a width w21 between phase shifts 1885 and 1890. A separation t20 separates fifth magnetic phase shift 1875 and seventh magnetic phase shift 1885. A separation s20 separates sixth magnetic phase shift 1880 and seventh magnetic phase shift 1885.

In the illustrated embodiment of FIG. 18B, w18=w19=w20=w21. In certain embodiments, in Subframe 1850 w18=w19=w20=w21=2.0 microns.

In the illustrated embodiment of FIG. 18B, t18=t19=t20. In certain embodiments in Subframe 1850, t18=t19=t20=5 microns. In the illustrated embodiment of FIG. 18B, s18=s19=s20. In certain embodiments in Subframe 1850, s18=s19=s20=3.0 microns.

FIG. 19A illustrates embodiment 1900 of Applicant's Subframe 3, wherein embodiment 1900 encodes a value of "1010." In embodiment 1900, Applicant's Subframe 3 comprises two pulses, namely pulses 18 and 20, but not pulses 19 and 21.

In the illustrated embodiment of FIG. 19A, pulse 18 of Subframe 1900 comprises a first magnetic phase shift 1905, a second magnetic phase shift 1910, and a width w18 between phase shifts 1905 and 1910. Pulse 20 of Subframe 1900 comprises a third magnetic phase shift 1915, a fourth magnetic phase shift 1920, and a width w20 between phase shifts 1915 and 1920. A separation t18 separates first magnetic phase shift 1905 and third magnetic phase shift 1915. A separation s18 separates second magnetic phase shift 1910 and third magnetic phase shift 1915.

In the illustrated embodiment of FIG. 19A, w18=w20. In certain embodiments, in Subframe 1900 w18=w20=2.0 microns. In the illustrated embodiment of FIG. 19A, t18=10 microns. In the illustrated embodiment of FIG. 19A, s18=8.0 microns.

FIG. 19B illustrates embodiment 1950 of Applicant's Subframe 3, wherein embodiment 1950 encodes a value of "1010." In the illustrated embodiment of FIG. 19B, pulse 18 of Subframe 1950 comprises a first magnetic phase shift 1955, a second magnetic phase shift 1960, and a width w18 between phase shifts 1955 and 1960. Pulse 19 of Subframe 1950 comprises a third magnetic phase shift 1965, a fourth magnetic phase shift 1970, and a width w19 between phase shifts 1965 and 1970. A separation t18 separates first magnetic phase shift 1955 and third magnetic phase shift 1965. A separation s18 separates second magnetic phase shift 1960 and third magnetic phase shift 1965.

Pulse 20 of Subframe 1950 comprises a fifth magnetic phase shift 1975, a sixth magnetic phase shift 1980, and a width w20 between phase shifts 1975 and 1980. A separation t19 separates third magnetic phase shift 1965 and fifth magnetic phase shift 1975. A separation s19 separates fourth magnetic phase shift 1970 and fifth magnetic phase shift 1975.

Pulse 21 of Subframe 1950 comprises a seventh magnetic phase shift 1985, an eighth magnetic phase shift 1990, and a width w21 between phase shifts 1985 and 1990. A separation t20 separates fifth magnetic phase shift 1975 and seventh magnetic phase shift 1985. A separation s20 separates sixth magnetic phase shift 1980 and seventh magnetic phase shift 1985.

In the illustrated embodiment of FIG. 19B, w18=w20, and w19=w21. In certain embodiments, in Subframe 1950 w18=w20=2.5 microns. In certain embodiments, in Subframe 1950 w19=w21=2.0 microns.

In the illustrated embodiment of FIG. 19B, t18=t19=t20. In certain embodiments in Subframe 1950, t18=t19=t20=5 microns. In the illustrated embodiment of FIG. 19B, s18=s20. In certain embodiments in Subframe 1950, s18=s20=2.5 microns. In certain embodiments in Subframe 1950, s19=3.0 microns.

FIG. 20A illustrates embodiment 2000 of Applicant's Subframe 3, wherein embodiment 2000 encodes a value of "0110." In embodiment 2000, Applicant's Subframe 3 comprises two pulses, namely pulses 19 and 20, but not pulses 18 and 21.

In the illustrated embodiment of FIG. 20A, pulse 19 of Subframe 2000 comprises a first magnetic phase shift 2005, a second magnetic phase shift 2010, and a width w19 between phase shifts 2005 and 2010. Pulse 20 of Subframe 2000 comprises a third magnetic phase shift 2015, a fourth magnetic phase shift 2020, and a width w20 between phase shifts 2015 and 2020. A separation t19 separates first magnetic phase shift 2005 and third magnetic phase shift 2015. A separation s19 separates second magnetic phase shift 2010 and third magnetic phase shift 2015.

In the illustrated embodiment of FIG. 20A, w19=w20. In certain embodiments, in Subframe 2000 w19=w20=2.0 microns. In the illustrated embodiment of FIG. 20A, t19=5 microns. In the illustrated embodiment of FIG. 20A, s19=3 microns.

FIG. 20B illustrates embodiment 2050 of Applicant's Subframe 3, wherein embodiment 20200 encodes a value of "0110." In the illustrated embodiment of FIG. 20B, pulse 18 of Subframe 2050 comprises a first magnetic phase shift 2055, a second magnetic phase shift 2060, and a width w18 between phase shifts 2055 and 2060. Pulse 19 of Subframe 2050 comprises a third magnetic phase shift 2065, a fourth magnetic phase shift 2070, and a width w19 between phase shifts 2065 and 2070. A separation t18 separates first magnetic phase shift 2055 and third magnetic phase shift 2065. A separation s18 separates second magnetic phase shift 2060 and third magnetic phase shift 2065.

Pulse 20 of Subframe 2050 comprises a fifth magnetic phase shift 2075, a sixth magnetic phase shift 2080, and a width w20 between phase shifts 2075 and 2080. A separation t19 separates third magnetic phase shift 2065 and fifth magnetic phase shift 2075. A separation s19 separates fourth magnetic phase shift 2070 and fifth magnetic phase shift 2075.

Pulse 21 of Subframe 2050 comprises a seventh magnetic phase shift 2085, an eighth magnetic phase shift 2090, and a width w21 between phase shifts 2085 and 2090. A separation t20 separates fifth magnetic phase shift 2075 and seventh magnetic phase shift 2085. A separation s20 separates sixth magnetic phase shift 2080 and seventh magnetic phase shift 2085.

In the illustrated embodiment of FIG. 20B, w18=w21, and w19=w20. In certain embodiments, in Subframe 2050 w19=w20=2.5 microns. In certain embodiments, in Subframe 2050 w18=w21=2.0 microns.

In the illustrated embodiment of FIG. 20B, t18=t19=t20. In certain embodiments in Subframe 2050, t18=t19=t20=5 microns. In the illustrated embodiment of FIG. 20B, s19=s20. In certain embodiments in Subframe 2050, s19=s20=2.5 microns. In certain embodiments in Subframe 2050, s18=3.0 microns.

In certain embodiments, Applicant's sequential information storage medium comprises a plurality of servo patterns encoded sequentially along its length. In certain embodiments, Applicant's method aggregates the information encoded in a sequential plurality of Applicant's servo patterns 400 to form one or more words.

Prior art methods aggregate the information encoded in 36 sequential servo patterns to form three words, wherein the information encoded in four sequential servo patterns comprises manufacturer information, and wherein the information encoded in eight sequential servo patterns comprises sync information, and wherein the information encoded in twenty-four (24) sequential servo patterns comprises LPOS information.

As those skilled in the art will appreciate, each of Applicant's servo patterns allows the encoding of four times the amount information. Using 4 of Applicant's servo patterns allows the encoding of 4 times the amount of manufacturer information as does use of prior art servo patterns. As those skilled in the art will appreciate, use of Applicant's servo pattern 400 allows a higher reliability in the decoding of manufacturer information as compared to the use of prior art servo patterns.

Using the prior art servo patterns and methods, eight sequential prior art servo patterns are used to encode sync information, and comprise, in the aggregate, 8 bits of information. Using Applicant servo pattern 400, eight sequential servo patterns can encode sync information comprising, in the aggregate, 32 bits.

Using the prior art servo patterns and methods, the 24 sequential servo patterns which in combination are used to encode LPOS information comprise, in the aggregate, 24 bits of information. Using Applicant servo pattern 400, 24 sequential servo patterns can encode 96 bits of information. As those skilled in the art will appreciate, use of Applicant's servo pattern 400 allows a higher reliability in the decoding of LPOS information as compared to the use of prior art servo patterns.

Alternatively, use of 9 sequential servo patterns 400 can encode as much information as use of 36 prior art servo patterns 100. Applicant's servo pattern 400 comprises up to 22 pulses, wherein the prior art servo pattern 100 comprises 19 pulses. consequently, Applicant's servo pattern 400 comprises about 1.22 times the length of prior art servo pattern 100.

A sequence of 36 prior art servo patterns 100 comprises a reference length of 36. A sequence of 9 of Applicant's servo patterns 400 comprises a length of 9 times 1.22 or 10.98, i.e. about one third the aggregate length of 36 prior art servo patterns. Therefore, using a sequence of 9 of Applicant's servo pattern 400, thereby encoding 36 bits of information wherein 24 of those bits comprise LPOS information, a tape drive can position a data/servo head assembly at a specified LPOS address thereby achieving a longitudinal resolution of about 2.4 mm compared with the prior art resolution of about 7.2 mm.

Applicant's invention further comprises an article of manufacture, such as and without limitation a tape drive apparatus, a data storage controller, an automated data storage library, a host computing device comprising a storage management program and in communication with a data storage library, wherein that article of manufacture comprises a computer readable medium comprising computer readable program code comprising a series of computer readable program steps to effect encoding a plurality of Applicant's servo pattern 400 in one or more non-data regions of a sequential information storage medium, and/or decoding information encoded in a plurality of Applicant's servo pattern 400.

Applicant's invention further includes a computer program product encoded in a computer readable medium and usable with a computer processor to encode a plurality of Applicant's servo pattern 400 in one or more non-data regions of a sequential information storage medium, and/or decode information encoded in a plurality of Applicant's servo pattern 400.

While the preferred embodiments of the present invention have been illustrated in detail, it should be apparent that modifications and adaptations to those embodiments may occur to one skilled in the art without departing from the scope of the present invention as set forth in the following claims.

I claim:

1. A sequential data storage medium, comprising a plurality of servo patterns encoded in a non-data region, wherein each of said servo patterns comprises:
    a first subframe comprising 10 pulses;
    a second subframe comprising 8 pulses;
    wherein said first subframe and said second subframe do not encode any linear position ("LPOS") data;
    a third subframe comprising (N) pulses and encoding up to (N) LPOS bits, wherein (N) is greater than or equal to 0.

2. The sequential data storage medium of claim 1, wherein said third subframe comprises one pulse.

3. The sequential data storage medium of claim 2, wherein said third subframe encodes a value selected from the group consisting of 1, 01, 10, 100, 010, 001, 1000, 0100, 0010, and 0001.

4. The sequential data storage medium of claim 1, wherein said third subframe comprises two pulses.

5. The sequential data storage medium of claim 4, wherein said third subframe encodes a value selected from the group consisting of 11, 110, 011, 101, 1100, 1010, 1001, 0110, 0101, and 0011.

6. The sequential data storage medium of claim 1, wherein said third subframe comprises three pulses.

7. The sequential data storage medium of claim 6, wherein said third subframe and encodes a value selected from the group consisting of 111, 1110, 1101, 1011, and 0111.

8. The sequential data storage medium of claim 1, wherein said third subframe comprises four pulses.

9. The sequential data storage medium of claim 8, wherein said third subframe encodes a value of 1111.

10. The sequential data storage medium of claim 8, wherein:
    four pulses comprise said first width;
    said third subframe encodes a value of 1111.

11. The sequential data storage medium of claim 10, wherein:
    four pulses comprise said second width;
    said third subframe encodes a value of 0000.

12. The sequential data storage medium of claim 1, wherein said third subframe comprises zero pulses.

13. A sequential data storage medium, comprising a plurality of servo patterns encoded in a non-data region, wherein each of said servo patterns comprises:
    a first subframe comprising 10 pulses;
    a second subframe comprising 8 pulses;
    wherein said first subframe and said second subframe do not encode any linear position ("LPOS") data;
    a third subframe comprising (N) pulses and encoding up to (N) LPOS bits, wherein (N) is greater than or equal to 1;
    wherein each pulse comprises either a first width or a second width, wherein said first width is greater than said second width.

14. The sequential data storage medium of claim 13, wherein third subframe comprises two pulses.

15. The sequential data storage medium of claim 14, wherein third subframe encodes a value selected from the group consisting of 00, 01, 10, and 11.

16. The sequential data storage medium of claim 14, wherein third subframe encodes a value selected from the group consisting of 000, 001, 011, 111, 010, 110, and 111.

17. The sequential data storage medium of claim 13, wherein third subframe comprises three pulses.

18. The sequential data storage medium of claim 13, wherein:
    said third subframe comprises four pulses;
    one of said four pulses comprises a first width, and three of said pulses each comprises a second width, wherein said first width is greater than said second width;
    said third subframe encodes a value selected from the group consisting of 1000, 0100, 0010, and 0001.

19. The sequential data storage medium of claim 18, wherein:
    two of said four pulses comprise said first width, and two of said pulses comprise said second width;
    said third subframe encodes a value selected from the group consisting of 1100, 1010, 1001, 0110, 0101, and 0011.

20. The sequential data storage medium of claim 19, wherein:
    three of said pulses each comprises said first width, one of said four pulses comprises said second width;
    said third subframe encodes a value selected from the group consisting of 1110, 1101, 1011, and 0111.

* * * * *